US007486638B2

(12) United States Patent
Ofuji et al.

(10) Patent No.: US 7,486,638 B2
(45) Date of Patent: Feb. 3, 2009

(54) BASE STATION, CONTROL DEVICE, COMMUNICATION SYSTEM AND COMMUNICATION METHOD

(75) Inventors: Yoshiaki Ofuji, Yokosuka (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 916 days.

(21) Appl. No.: 10/352,862

(22) Filed: Jan. 29, 2003

(65) Prior Publication Data

US 2003/0142658 A1 Jul. 31, 2003

(30) Foreign Application Priority Data

Jan. 31, 2002 (JP) ............................. 2002-024770

(51) Int. Cl.
*H04Q 7/28* (2006.01)
*H04J 3/24* (2006.01)
*H04L 12/28* (2006.01)
*H04Q 7/20* (2006.01)
*H04M 1/00* (2006.01)

(52) U.S. Cl. .................... 370/329; 370/349; 455/452.2; 455/562.1

(58) Field of Classification Search ................. 370/349, 370/324, 278, 328, 329, 338, 341, 395.4
See application file for complete search history.

(56) References Cited

U.S. PATENT DOCUMENTS 6,097,703 A * 8/2000 Larsen et al. ............... 370/254

| 6,317,416 | B1 * | 11/2001 | Giroux et al. ............... 370/232 |
| 6,347,083 | B1 * | 2/2002 | Nishino ...................... 370/342 |
| 6,374,112 | B1 * | 4/2002 | Widegren et al. ......... 455/452.2 |
| 6,788,687 | B2 * | 9/2004 | Bao et al. ................... 370/394 |
| 6,965,568 | B1 * | 11/2005 | Larsen ....................... 370/238 |

(Continued)

FOREIGN PATENT DOCUMENTS

EP 0 886 403 12/1998

(Continued)

OTHER PUBLICATIONS

Paul Bender, et al. "CDMA/HDR: A Bandwidth-Efficient High-Speed Wireless Data Service for Nomadic Users," IEEE Communications Magazine, vol. 38, No. 7, Jul. 2000, pp. 70-77.

(Continued)

*Primary Examiner*—Seema S. Rao
*Assistant Examiner*—Xavier Sze-Wai Wong
(74) *Attorney, Agent, or Firm*—Oblon, Spivak, McClelland, Maier & Neustadt, P.C.

(57) ABSTRACT

A base station includes an acquisition unit for acquiring a packet transmitted from a terminal device to a mobile station, a priority calculation unit for calculating priority of transmission of the packet acquired by the acquisition unit to the mobile station, a weight processing unit for conducting weighting on the priority of the packet calculated by the priority calculation unit, a channel control unit for assigning a channel for transmission of the packet to the mobile station, to the packet based on the priority of the packet weighted by the weight processing unit, and a transmission unit for transmitting the packet to the mobile station on the channel assigned by the channel control unit.

15 Claims, 21 Drawing Sheets

U.S. PATENT DOCUMENTS 6,968,212 B1 * 11/2005 Aoyama et al. .......... 455/562.1
2002/0089965 A1 * 7/2002 Kim .......................... 370/342

FOREIGN PATENT DOCUMENTS

| EP | 886403 A1 * | 12/1998 |
| EP | 0886403 A1 * | 12/1998 |
| EP | 1 128 698 | 8/2001 |
| EP | 1128698 A2 * | 8/2001 |
| EP | 1 195 921 | 4/2002 |
| JP | 2000-224231 | 8/2000 |
| WO | WO 01/74027 | 10/2001 |
| WO | WO0174027 A1 * | 10/2001 |
| WO | WO 01/91332 | 11/2001 |

OTHER PUBLICATIONS

Toyoki Ue, et al. "Symbol Rate and Modulation Level-Controlled Adaptive Modulation/TDMA/TDD System for High-Bit-Rate Wireless Data Transmission," IEEE Transactions on Vehicular Technology, vol. 47, No. 4, Nov. 1998, pp. 1134-1147.

Shu Lin, et al. "Automatic-Repeat-Request Error-Control Schemes," IEEE Communications Magazine, vol. 22, No. 12, Dec. 1984, pp. 5-17.

A. Jalali, et al. "Data Throughput of CDMA-HDR a High Efficiency-High Data Rate Personal Communication Wireless System," Proc. of IEEE VTC2000-Spring, May 2000, pp. 1854-1858.

* cited by examiner

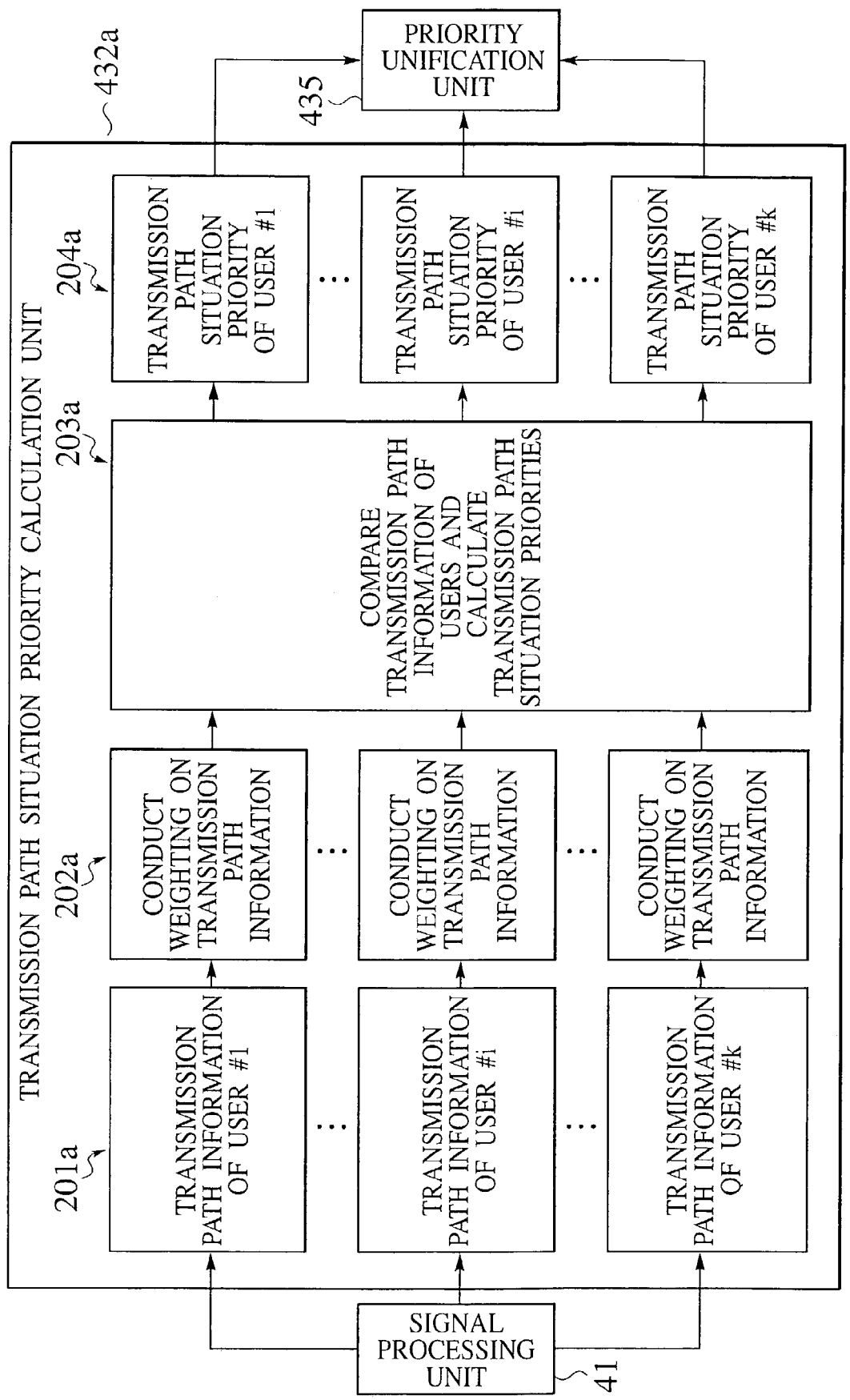

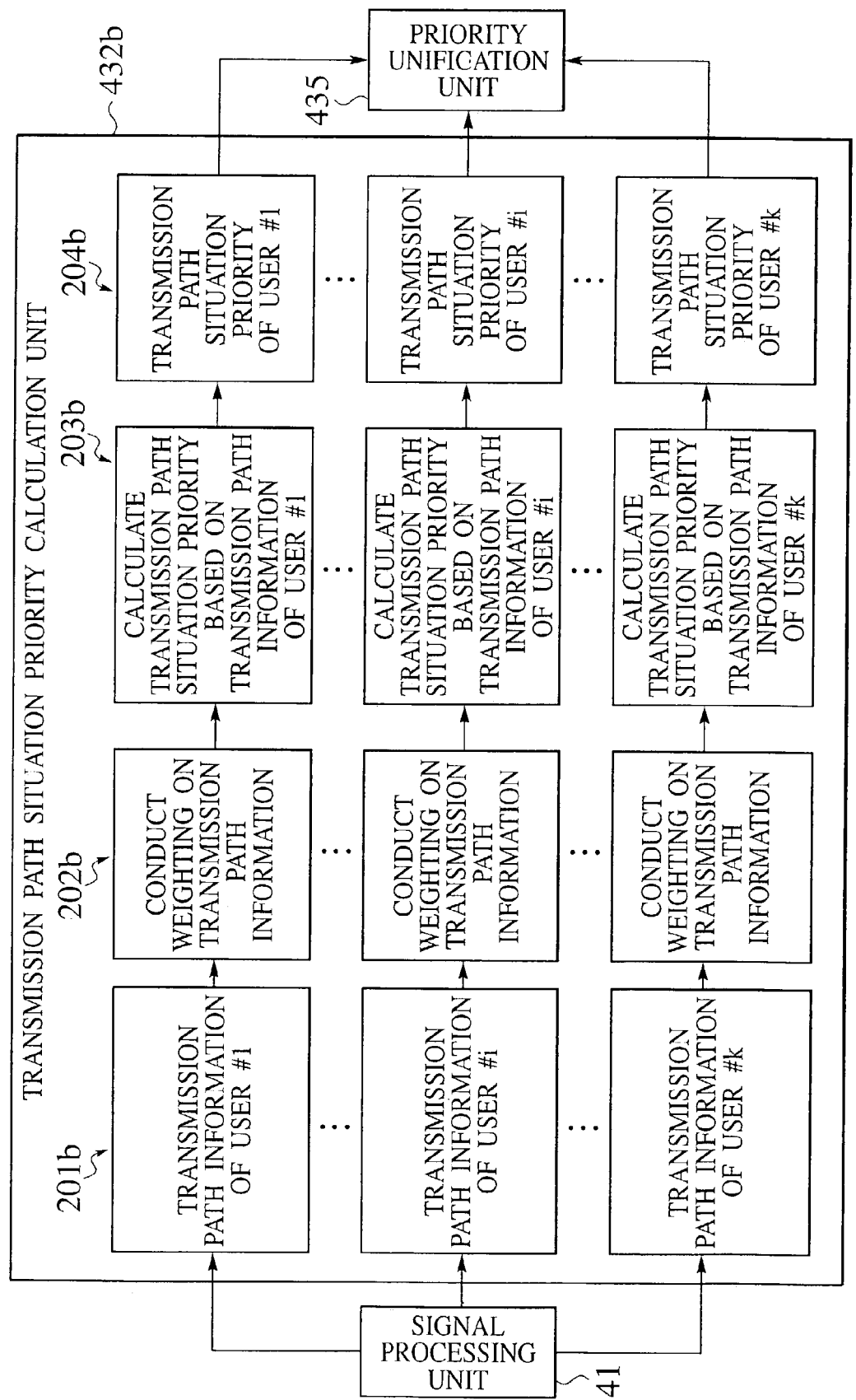

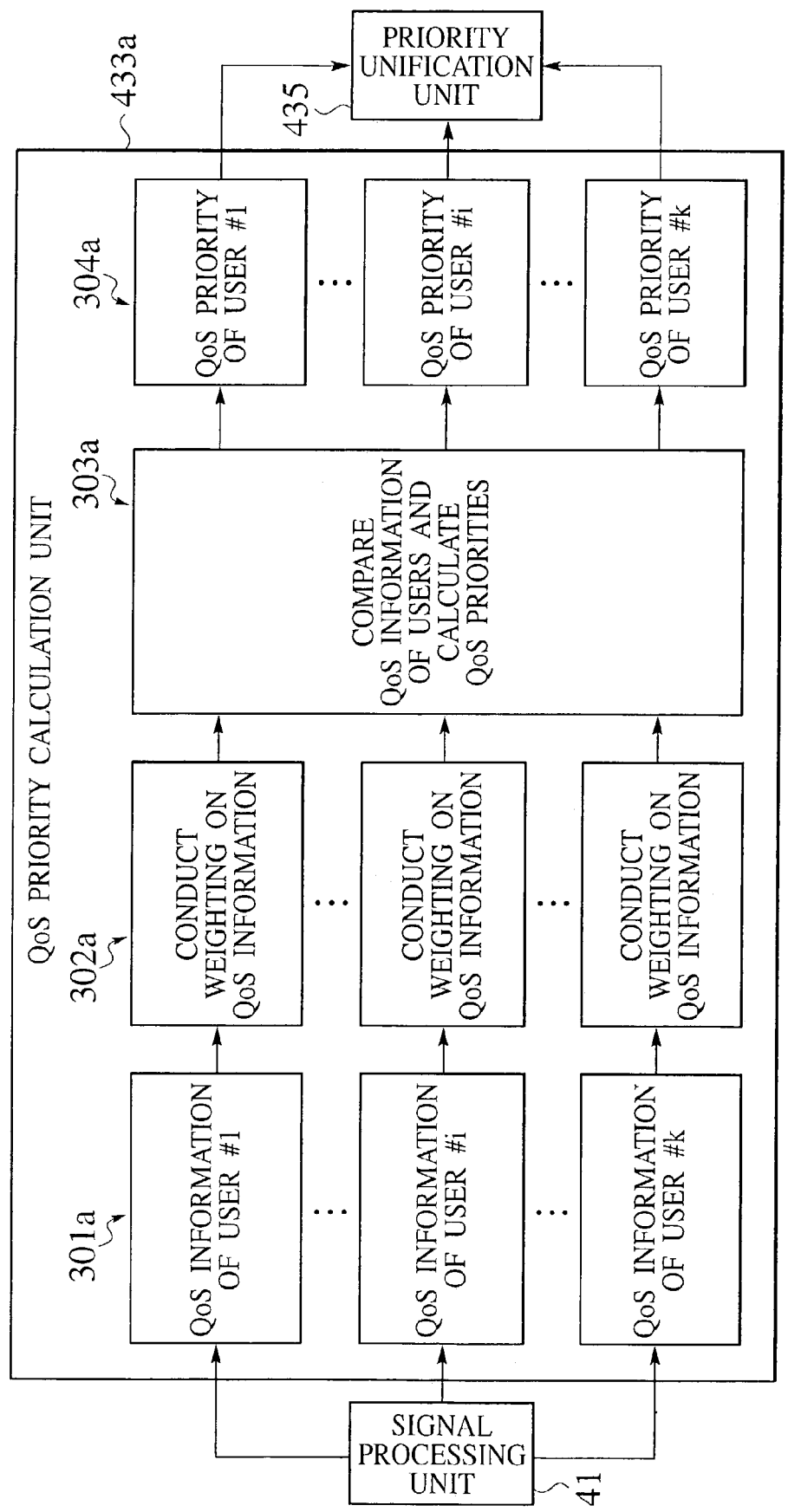

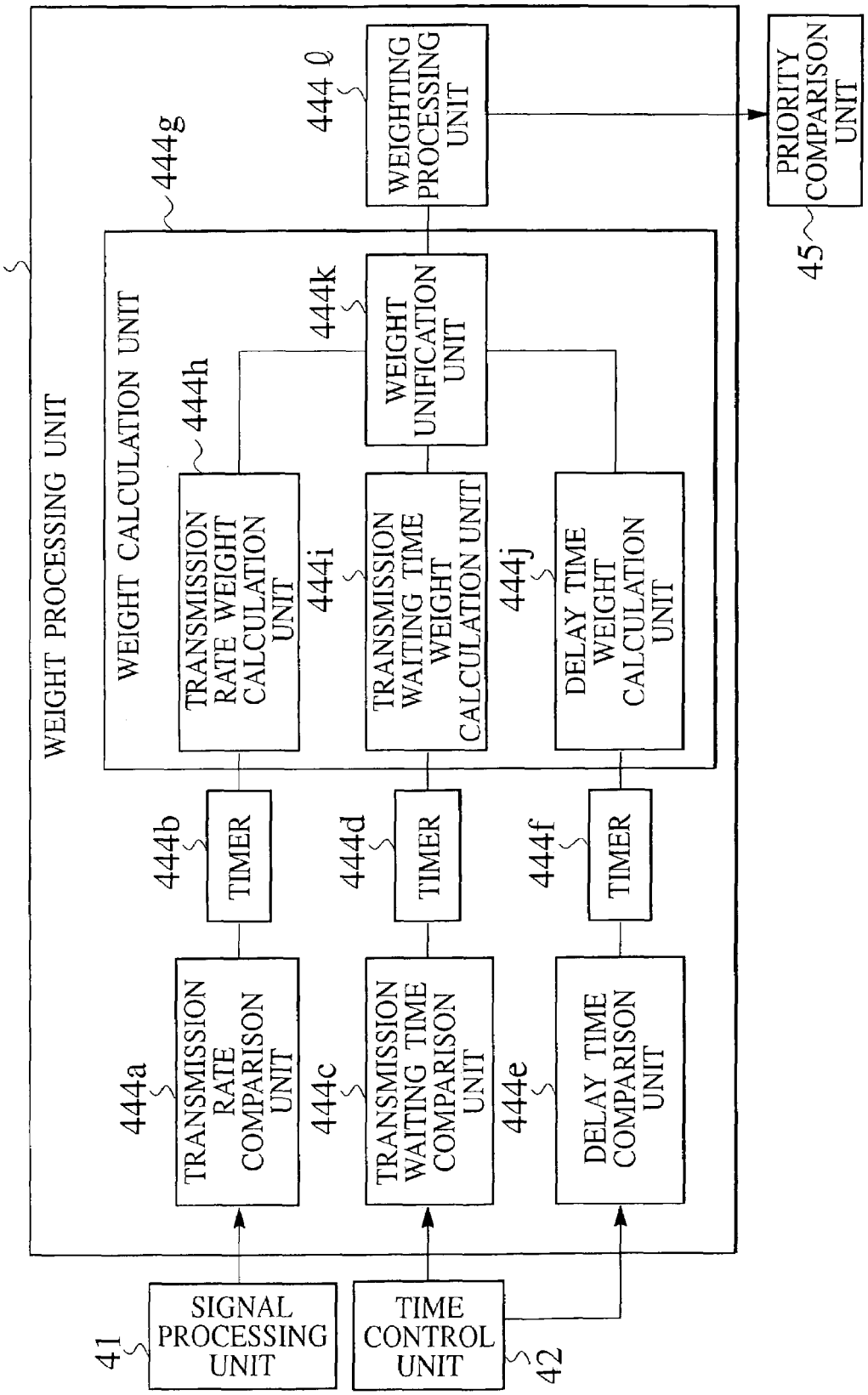

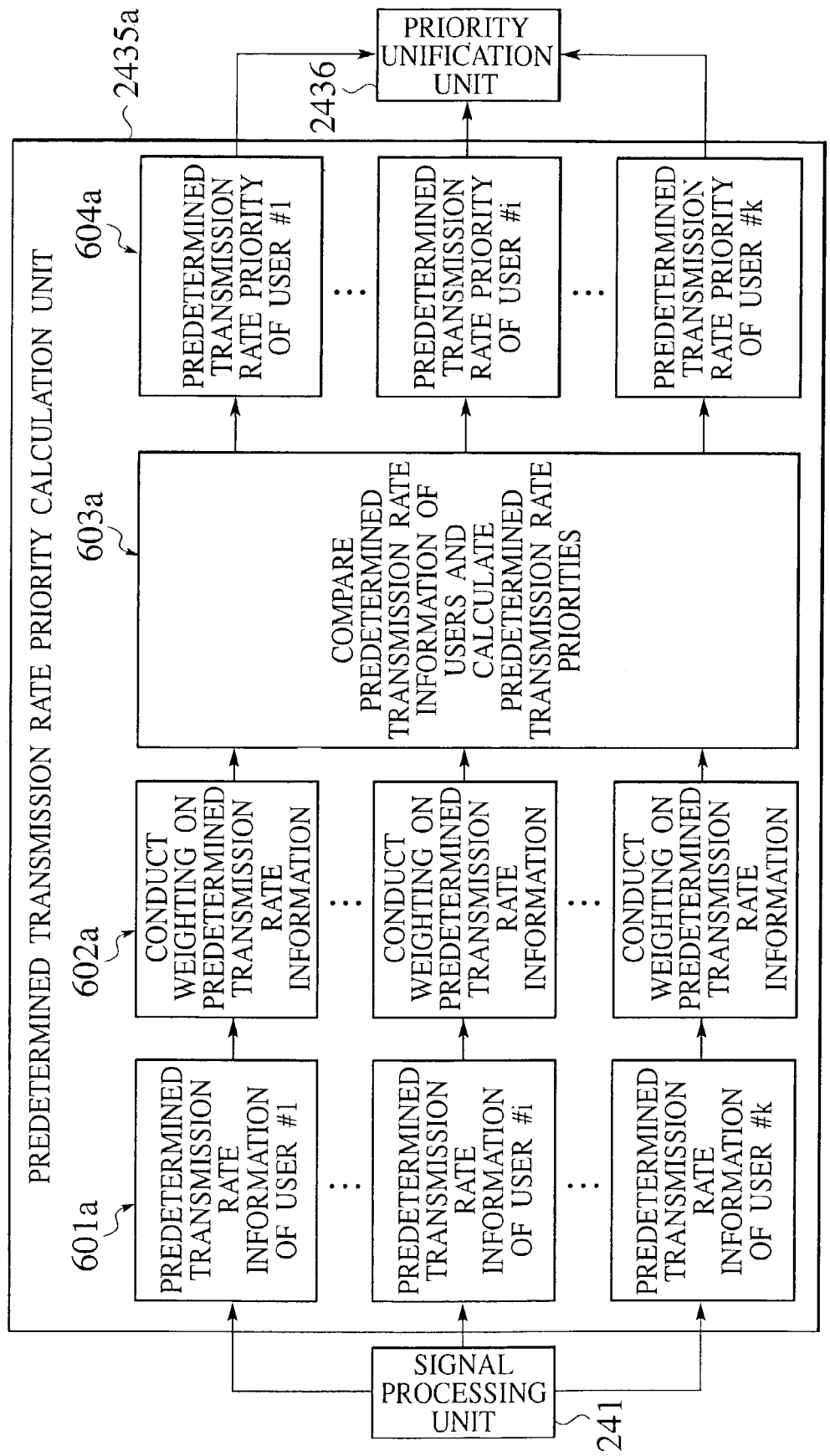

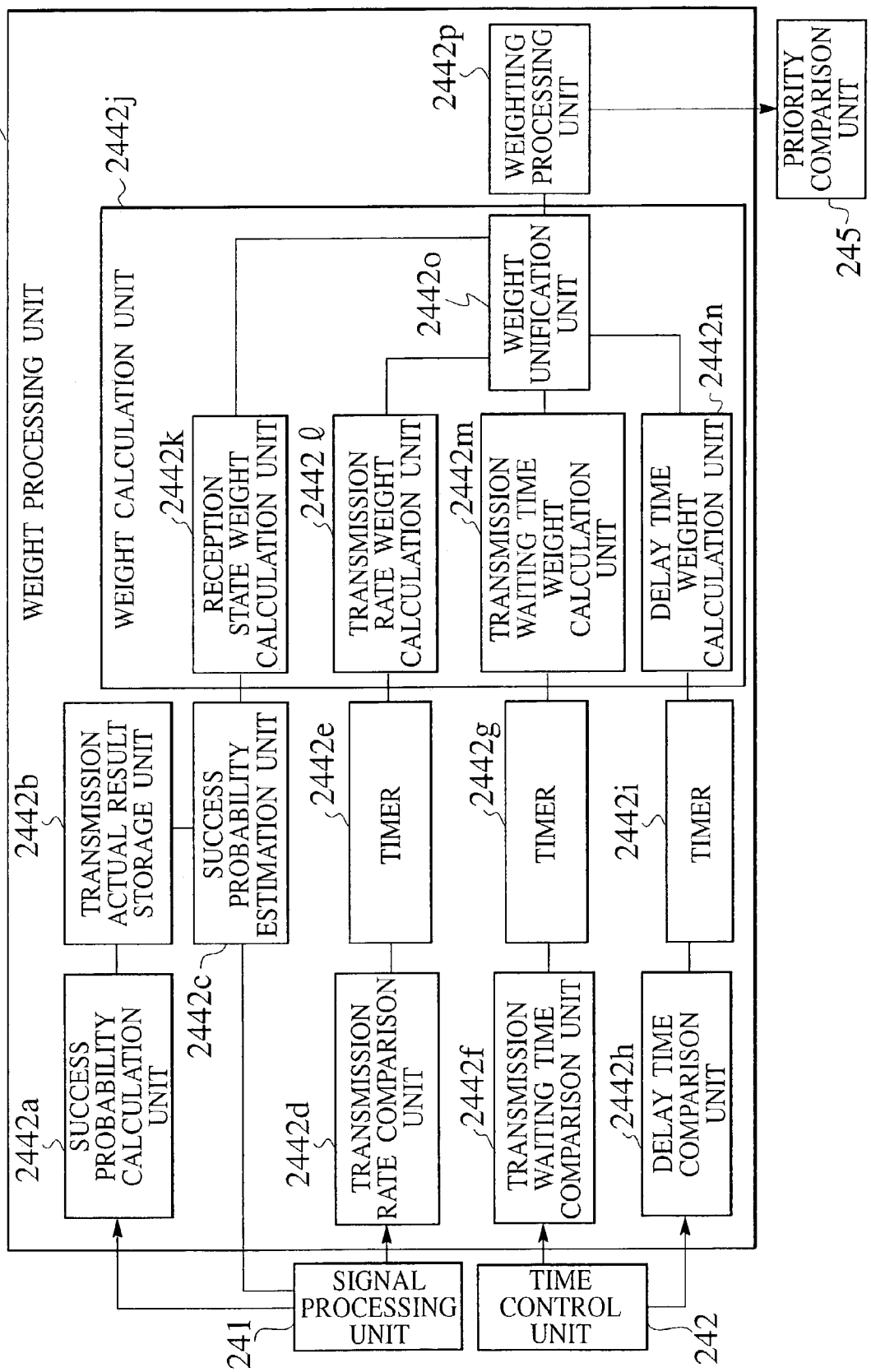

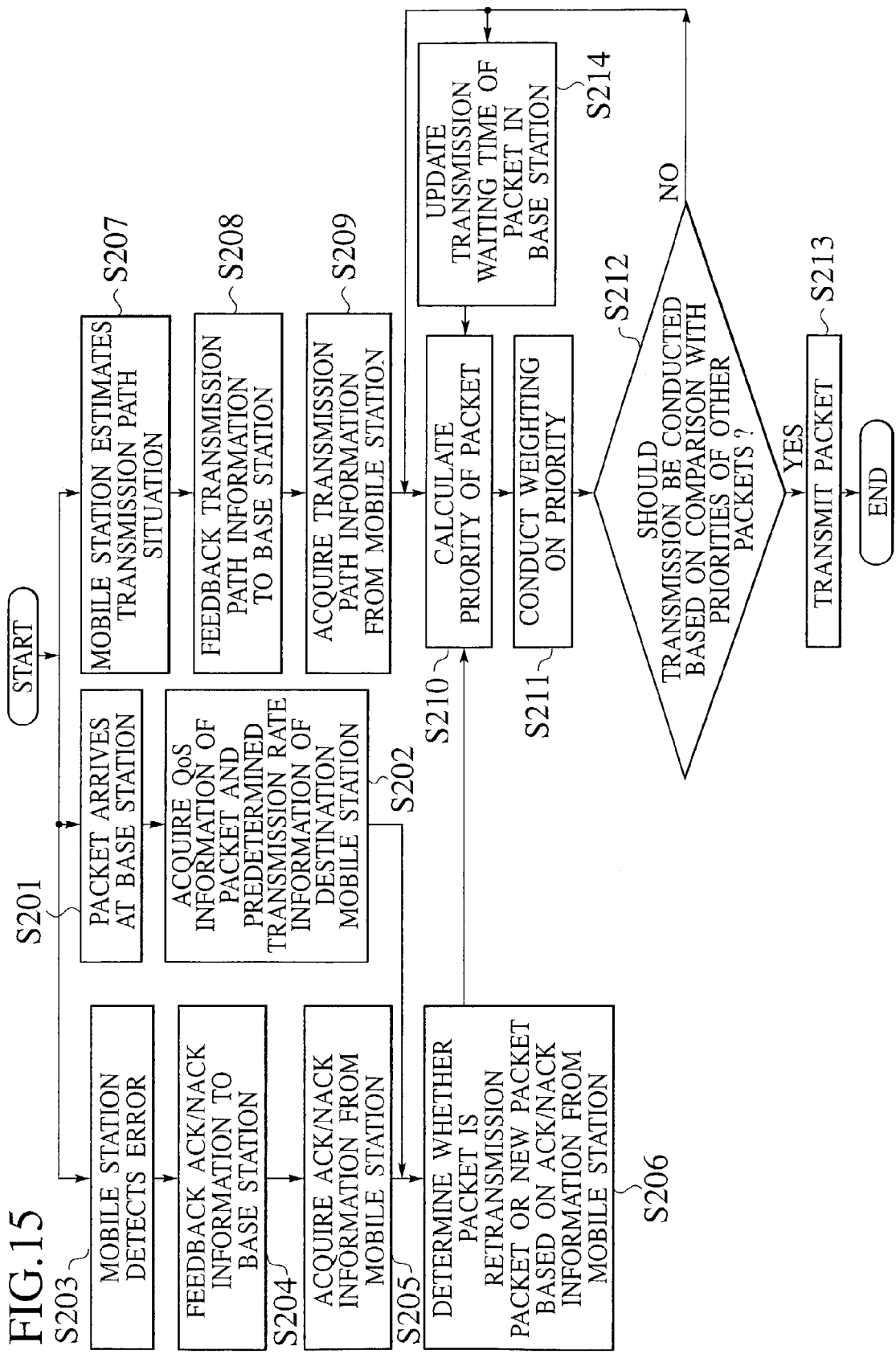

BASE STATION, CONTROL DEVICE, COMMUNICATION SYSTEM AND COMMUNICATION METHOD

CROSS REFERENCE TO RELATED APPLICATIONS

This application is based upon and claims the benefit of priority from the prior Japanese Patent Applications No. P2002-24770, filed on Jan. 31, 2002; the entire contents of which are incorporated herein by reference.

BACKGROUND OF THE INVENTION

1. Field of the Invention

The present invention relates to a base station, a control device, a communication system, and a communication method.

2. Description of the Related Art

Requirements for a maximum information transmission rate in a moving environment, walking environment, and quasi-stationary environment of the next generation mobile communication system, i.e., International Mobile Telecommunication—2000 (IMT-2000) are 144 kbps, 384 kbps, and 2 Mbps, respectively. As a result, it becomes possible to implement real multimedia mobile communication in addition to voice service. Considering rapid spread of Internet, increases in the dimension of information, increases in the capacity of information, and development of the next generation Internet in recent years, however, there is a pressing need in the mobile communication system to develop a radio access scheme capable of implementing a transmission rate exceeding 2 Mbps. It is considered to be increasing especially in a radio link for down direction traffic required to be at a high rate and have a large capacity, such as for downloading an image, a file, or a dynamic image such as video data from a database or a Web site. Therefore, a high speed packet transmission technique suitable for traffic of high speed and large capacity is indispensable.

From the background as described above, a scheme for implementing high speed packet transmission with a maximum transmission rate of 2,4 Mbps based on a radio interface of IS-95 has been proposed ("CDMA/HDR: A Bandwidth—Efficient High-Speed Wireless Data Services for Nomadic Users," P. Bender, P. Black, M. Grob, R. Padovani, N. Shindhushyana, and A. Viterbi, IEEE Communication Magazine, Vol. 38, no. 7, pp. 70-77, July 2000, which is hereafter referred to as first paper). Furthermore, in 3GPP (3rd Generation Partnership Project) as well, implementation of high speed packet transmission having a maximum transmission rate of approximately 2.4 Mbps obtained by expanding the W-CDMA (Wideband Code Division Multiple Access) radio interface is studied.

As for such high speed packet transmission, application of a technique, such as adaptive modulation and demodulation and error correction, based on adaptive radio link control (link adaptation), such as channel coding, proposed in "Symbol Rate and Modulation Level—Controlled Adaptive Modulation/TDMA/TDD system for High-Bit-Rate Wireless Data Transmission," T. Ue, S. Sampei, and N. Morinaga, IEEE Transaction. VT, pp. 1134 - 1147, Vol. 47, no. 4, November 1988 is studied. In the adaptive modulation and demodulation and error correction, based on adaptive radio link control, the multivalue number of data modulation, spreading factor, the multicode multiplex number, and the coding factor of error correction are switched over according to the propagation environment of a user, in order to conduct high speed data transmission efficiently.

For example, as for data modulation, the QPSK (Quadrature Phase Shift Keying) modulation used in the current W-CDMA is switched over to a multi-value modulation having a higher efficiency, such as 8 PSK modulation, 16 QAM (Quadrature Amplitude Modulation) modulation, or 64 QAM modulation, as the propagation environment becomes favorable. As a result, the transmission speed of the communication system can be increased. For example, if data modulation using 64 QAM is conducted in the case where the spreading factor=4, the number of multi-codes=3, and the error correction coding factor=½, ultra-high speed data transmission of 8.5 Mbps becomes possible with a W-CDMA interface having a chip rate of 3.84 Mcps. As for the high speed packet transmission, application of the ARQ (Automatic Repeat request) technique proposed in "Automatic-Repeat-Request Error Control Schemes," S. Lin, D. Costello. Jr., and M. Miller, IEEE Communication Magazine, Vol. 12, no. 12, pp. 5-17, December 1984 is also studied.

On the other hand, in order to conduct such packet transmission efficiently, there is proposed a communication method in which a base station that transmit and receive packets monitors the situation of data transmission paths formed between the base station and mobile stations that conduct communication with the base station, determines a mobile station to which packets should be transmitted, and assigns a channel. For example, in the above-described first paper, there is proposed a method of maximizing throughput in a sector or a cell by giving priority to transmission of a packet to a mobile station that is favorable in reception state and transmitting a packet preferentially to the mobile station.

However, this communication method causes unfairness that only a specific mobile station can conduct communication and other mobile stations cannot conduct communication. In order to reduce the unfairness, therefore, there is proposed a communication method of deriving a ratio of an average value of a transmission rate determined by a past transmission path situation to a current instantaneous transmission rate, and transmitting a packet to a mobile station that is large in the ratio ("Data throughput of CDMA—HDR a High Efficiency—High Data Rate Personal Communication Wireless System," J. Jalali, R. Padovani, R. Pankaj, Proc. of IEEE VTC 2000—Spring, pp. 1854 - 1858, Tokyo, May 2000). This communication method has an advantage that unfairness among mobile stations is mitigated. In Japanese Patent Application Laid-Open Publication No. 2000-224231, there is proposed a packet data communication method of deriving priority every packet data and assigning channels earlier to packet data having high priority.

Once a base station has decided to transmit a certain packet based on the reception state and transmission rate, however, thereafter the base station assigns a channel to the packet and transmits the packet, in the conventional communication method. Also when deriving priority of transmission, once the base station has derived priority, thereafter the base station assigns a channel to the packet based on the priority. When actually transmitting the packet, however, there might occur a situation where a packet having low priority should be transmitted rather than a packet decided once to be transmitted or a packet having priority once derived. Even for a packet once decided to be transmitted or a packet having high priority derived once, there might occurs a situation where it is not necessary to transmit the packet immediately.

Even if such a situation occurs, the base station conducts channel assignment according to the priority once derived, in the conventional communication method. In the conventional communication method, therefore, the base station cannot conduct channel assignment according to the situation at the time of transmission without being restricted by the priority once derived. For example, if the reception state of a mobile station that is destination of a packet is not good when a base station transmits the packet, then the possibility that the transmission will fail is high even if the packet has high priority. This results in high possibility that radio resources will be wasted. From the viewpoint of preventing the radio resources from being wasted, therefore, it is preferable to transmit another packet rather than the packet having high priority. If priority derived once is high, however, then in the conventional communication method a channel is assigned to the packet though the reception state is not good, resulting in waste of radio resources.

In the case where there is a margin in permissible delay time needed in service quality of a packet when a base station transmits the packet, it is not necessary to transmit the packet immediately even if the packet has high priority. If there is another packet having high urgency, therefore, it is preferable to transmit the packet having high urgency preferentially. If priority derived once is high, however, then in the conventional communication method a channel is assigned to the packet though there is a margin in the permissible delay time and the packet is transmitted with a superfluous quality as compared with the permissible delay time.

BRIEF SUMMARY OF THE INVENTION

An object of the present invention is to provide a base station, a control device, a communication system, and a communication method capable of assigning a channel as occasion may demand according to the situation obtained when transmitting a packet, without being necessarily restricted by once decided priority of transmission of a packet to a mobile station.

A base station according to an aspect of the present invention includes an acquisition unit for acquiring a packet transmitted from a terminal device to a mobile station, a priority calculation unit for calculating priority of transmission of the packet acquired by the acquisition unit to the mobile station, a weight processing unit for conducting weighting on the priority of the packet calculated by the priority calculation unit, a channel control unit for assigning a channel for transmission of the packet from the base station to the mobile station, to the packet based on the priority of the packet weighted by the weight processing unit, and a transmission unit for transmitting the packet to the mobile station on the channel assigned by the channel control unit.

According to the base station, the acquisition unit acquires a packet transmitted from a terminal device toward a certain mobile station, from the terminal device. Subsequently, the priority calculation unit calculates priority of transmission of the packet acquired by the acquisition unit to the mobile station. The weight processing unit conducts weighting on the calculated priority. The channel control unit assigns a channel for transmission of the packet to the mobile station, to the packet based on the weighted priority. And the transmission unit transmits the packet to the mobile station on the assigned channel. Therefore, the weight processing unit can conduct weighting on the priority calculated once by the priority calculation unit, and the channel control unit can conduct channel assignment based on the weighted priority. As a result, the base station can assign a channel as occasion may demand according to the situation obtained when transmitting a packet, without being necessarily restricted by once calculated priority.

BRIEF DESCRIPTION OF SEVERAL VIEWS OF THE DRAWINGS

FIGS. 4A and 4B are diagrams showing a transmission path situation priority calculation unit according to a first embodiment of the present invention;

FIGS. 5A and 5B are diagrams showing a QoS priority calculation unit according to a first embodiment of the present invention;

FIGS. 7A, 7B, 7C and 7D are block diagrams showing configurations of a weight processing unit according to a first embodiment of the present invention;

FIGS. 13A and 13B are diagrams showing a predetermined transmission rate priority calculation unit according to a second embodiment of the present invention;

FIGS. 14A and 14B are block diagrams showing a weight processing unit according to a second embodiment of the present invention; and FIG. 15 is a flow diagram showing a procedure of a communication method according to a second embodiment of the present invention.

DETAILED DESCRIPTION OF THE INVENTION

Embodiments of the present invention will be described with reference to the drawings.

First Embodiment (Communication System)

Figure 1:
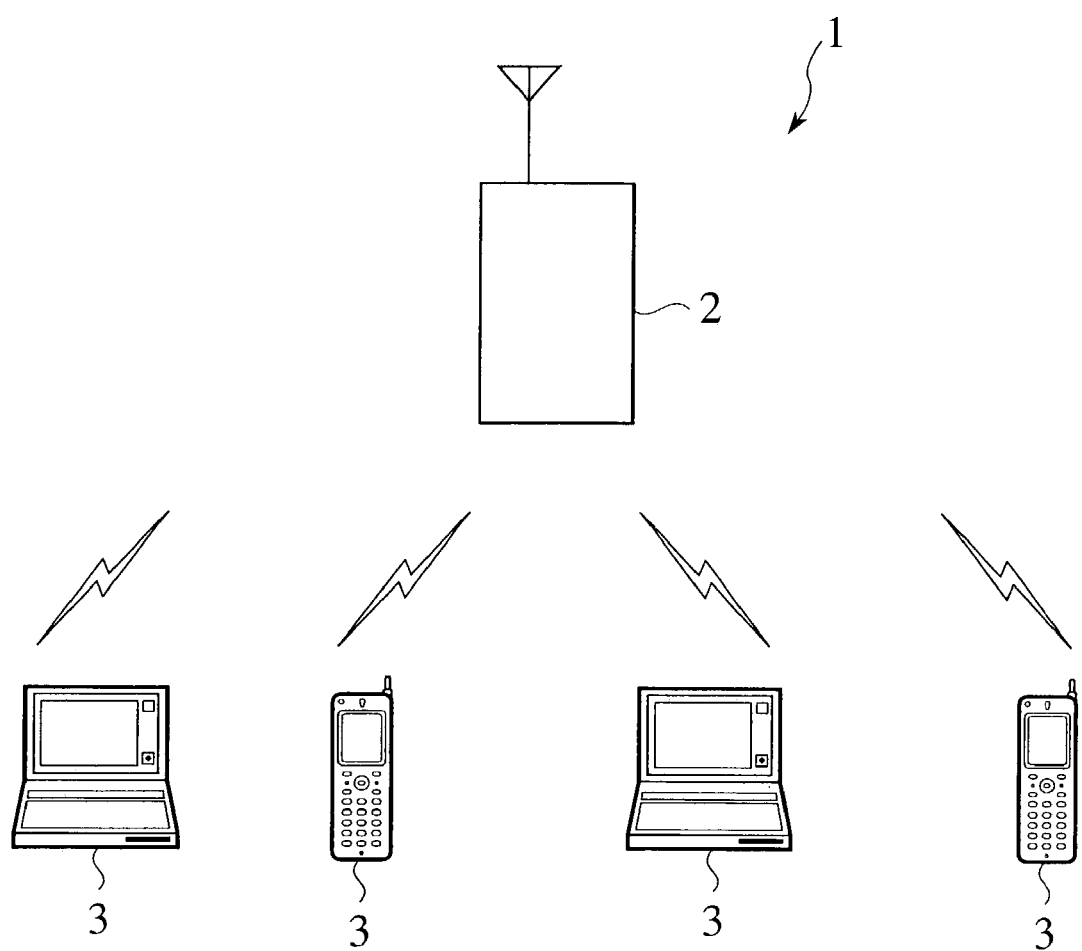
FIG. 1 is a diagram showing a configuration of a communication system according to a first embodiment of the present invention.

As shown in FIG. 1, a communication system 1 includes a base station 2 and a plurality of mobile stations 3. The mobile stations 3 transmit and receive packets. The mobile stations 3 are mobile terminals, such as portable telephones (cell phones) and PDAs, for conducting voice communication, dynamic image communication, and data communication. The base station 2 acquires, via a network, a packet transmitted from a terminal device, such as a mobile terminal, a personal computer or a server, to a mobile station 3. The base station 2 transmits the acquired packet to the mobile station 3.

Figure 2:
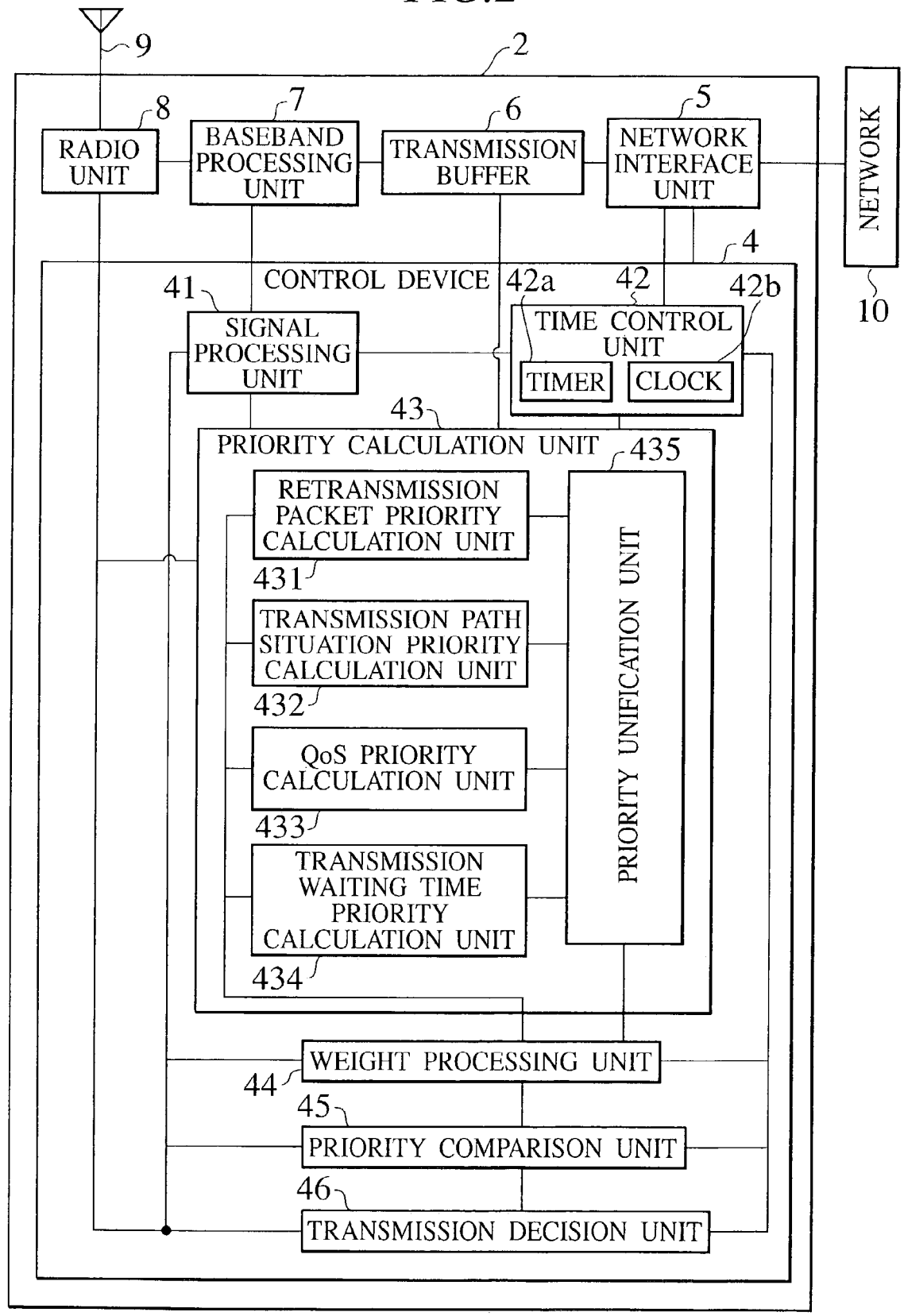
FIG. 2 is a block diagram showing a configuration of a base station according to a first embodiment of the present invention.

As shown in FIG. 2, the base station 2 includes a control device 4, a network interface unit 5, a transmission buffer 6, a baseband processing unit 7, a radio unit 8, and an antenna 9. The control device 4 includes a signal processing unit 41, a time control unit 42, a priority calculation unit 43, a weight processing unit 44, a priority comparison unit 45, and a transmission decision unit 46.

The network interface unit 5 is connected to a network 10. The network interface unit 5 is an acquisition unit for acquiring, via the network 10, a packet transmitted from a terminal device that is a transmission source of the packet to a mobile station 3. The network interface unit 5 stores the acquired packet in the transmission buffer 6. Upon acquiring the packet, the network interface unit 5 notifies the time control unit 42 of data for identifying the packet (hereafter referred to as "packet identification data"). Furthermore, the network interface unit 5 takes out a packet transmitted to the terminal device by the mobile station 3 and received by the radio unit 8, from the transmission buffer 6, and transmits the packet to the terminal device via the network 10 according to control of the control device 4.

The transmission buffer 6 is a packet holding unit for holding packets. A packet is stored in the transmission buffer 6 by the network interface unit 5 or the baseband processing unit 7. A packet held in the transmission buffer 6 is taken out by the baseband processing unit 7 or the network interface unit 5. The baseband processing unit 7 conducts signal processing, such as error correction coding and spreading modulation, on the transmission signal to be transmitted to the mobile station 3 and conducts signal processing, such as error correction decoding and despreading, on the received signal received by the radio unit 8. Furthermore, the baseband processing unit 7 takes out a packet to be transmitted to the mobile station 3, from the transmission buffer 6, conducts the above-described signal processing on the packet, and provides the radio unit 8 with the processed packet. Furthermore, the baseband processing unit 7 acquires a packet transmitted to the terminal device by the mobile station 3 and received by the radio unit 8, from the radio unit 8, and stores the packet in the transmission buffer 6.

The packet includes a data part transmitted to the mobile station 3 by a terminal device and a control information part for controlling transmission of the packet. The control information part includes information concerning QoS (Quality of Service) of the packet (hereafter referred to as "QoS information"), data identifying a user of the mobile station 3 of the transmission destination of the packet (hereafter referred to as "destination user identification data"), packet identification data, and time when the terminal device of the transmission source has transmitted the packet (hereafter referred to as "source transmission time"). The baseband processing unit 7 takes out the control information part of the packet taken out from the transmission buffer 6, and provides the signal processing unit 41 with the control information part. The QoS information includes permissible delay time of data, a service class used in the transmission of the packet, such as voice communication service, dynamic image communication service, or data communication service, and a packet transmission rate assured by the QoS (hereafter referred to as "QoS-assured transmission rate").

Furthermore, the baseband processing unit 7 acquires a control signal from the radio unit 8. The control information contains ACK/NACK information and information concerning the transmission path situation (hereafter referred to as "transmission path information") transmitted from the mobile station 3. The baseband processing unit 7 the signal processing unit 41 with the control signal. A control channel in an up direction is set between the mobile station 3 and the base station 2. The mobile station 3 transmits the control signal to the base station 2 on the control channel. The ACK/NACK information means information concerning a result of reception of the packet in the mobile station 3, and including an ACK (Acknowledge) response, which indicates that reception of the packet has been successful, and a NACK (Negative Acknowledge) response, which indicates that the reception of the packet has failed and retransmission of the packet is requested.

The antenna 9 receives the control signal transmitted from the mobile station 3 and a packet directed to the terminal device, and provides the radio unit 8 with the control signal and the packet. Furthermore, the antenna 9 transmits a packet provided by the radio unit 8 to the mobile station 3. The radio unit 8 is a transmission unit for transmitting a packet on a channel assigned to the packet to the destination mobile station 3 under the control of the control device 4. The radio unit 8 conducts D-A conversion on a packet provided by the baseband processing unit 7, and transmits a resultant packet to the mobile station 3 via the antenna 9. Furthermore, the radio unit 8 receives the control signal and the packet directed to the terminal device from the mobile station 3 via the antenna 9, conducts A-D conversion on them, and provides the baseband processing unit 7 with them. The radio unit 8 notifies the priority calculation unit 43 of the number of mobile stations connected to the radio unit 8 formed transmission paths.

The control device 4 is provided in the base station 2. The control device 4 controls transmission of a packet to the mobile station 3 by assigning a channel for transmitting a packet to the mobile station 3, to a packet. The control device 4 controls reception of a packet transmitted from the mobile station 3 to the terminal device and transmission of the packet to the terminal device. The control device 4 controls the network interface unit 5, the baseband processing unit 7 and the radio unit 8. The signal processing unit 41 processes a control information part of a packet provided from the baseband processing unit 7, and takes out QoS information of the packet, destination user identification data, packet identification data and source transmission time contained in the control information part. Furthermore, the signal processing unit 41 conducts processing on the control signal from the mobile station 3 provided by the baseband processing unit 7, and takes out the transmission path information and the ACK/NACK information contained in the control signal.

The signal processing unit 41 provides the priority calculation unit 43 with the ACK/NACK information and QoS information of the packet in association with the packet identification data. Furthermore, the signal processing unit 41 provides the priority calculation unit 43, the weight processing unit 44, and the transmission decision unit 46 with destination user identification data and transmission path information of a transmission path formed between the base station and the destination mobile station 3 so as to be associated with packet identification data. Furthermore, the signal processing unit 41 provides the time control unit 42 with the source transmission time and the ACK/NACK information so as to be associated with packet identification data.

The time control unit 42 controls time concerning the packet, such as the packet transmission waiting time in the base station 2 and packet delay time. The time control unit 42 includes a timer 42a for measuring the time and a clock 42b for notifying the current time. As the control of the transmission waiting time, to be concrete, the time control unit 42 conducts measurement of the transmission waiting time and provision of the transmission waiting time (hereafter referred to as "transmission waiting time information") to the priority calculation unit 43 and the weight processing unit 44. When the network interface unit 5 has acquired a new packet, the time control unit 42 is notified of packet identification data by the network interface unit 5. Upon being notified of the packet identification data, the time control unit 42 starts the timer 42a, and starts measurement of the transmission waiting time of the packet. The measured value (timer value) of the timer 42a becomes the transmission waiting time as it is. In the present embodiment, the transmission waiting time becomes time during which the radio unit 8 does not transmit a packet since the network interface unit 5 has acquired the packet. It is time during which packet transmission is waited in the base station 2.

Periodically or upon being requested by the priority calculation unit 43 or the weight processing unit 44, the time control unit 42 provides the priority calculation unit 43 or the weight processing unit 44 with the packet transmission waiting time at that time point so as to be associated with the packet identification data. The time control unit 42 receives a notice to the effect that transmission is left over associated with the packet identification data, from the priority comparison unit 45. Furthermore, the time control unit 42 receives a notice from the transmission decision unit 46 as to whether transmission is possible associated with the packet identification data.

As for a packet the time control unit 42 is notified that transmission of which is possible by the transmission decision unit 46, the time control unit 42 turns off the timer 42a and finishes the measurement of the transmission waiting time. On the other hand, as for a packet the time control unit 42 is notified that transmission of which is left over or transmission of which is impossible by the priority comparison unit 45 or the transmission decision unit 46, the time control unit 42 continues the measurement of the transmission waiting time. Therefore, the transmission waiting time continues to be updated by the time control unit 42.

As the control of the delay time, to be concrete, the time control unit 42 conducts calculation of the delay time and notifying the priority calculation unit 43 and the weight processing unit 44 of the delay time. The time control unit 42 acquires the source transmission time associated with packet identification data from the signal processing unit 41 and holds it. The time control unit 42 acquires the current time from the clock 42b, compares the current time with the source transmission time, and calculates the time elapsed between a point in time at which the packet is transmitted by a source terminal device and the current time, i.e., the delay time of the packet at the current time. The clock 42b is set beforehand so as to notify the same time in the source terminal device and the base station 2.

Periodically or upon being requested by the priority calculation unit 43 or the weight processing unit 44, the time control unit 42 calculates the packet delay time at the point in time and provides the priority calculation unit 43 or the weight processing unit 44 with the calculated delay time so as to be associated with the packet identification data. The time control unit 42 acquires ACK/NACK information associated with the packet identification data from the signal processing unit 41. If the time control unit 42 has acquired the ACK information, then the transmission of the packet is successful and it becomes unnecessary to calculate the delay time of the packet, and consequently the time control unit 42 discards packet identification data of the packet. On the other hand, if the time control unit 42 has acquired the NACK information, then it is necessary to retransmit the packet and it is necessary to calculate the delay time, and consequently the time control unit 42 holds the packet identification data and the source transmission time of the packet as they are.

The priority calculation unit 43 calculates priority of transmission of a packet transmitted from the terminal device and acquired by the network interface unit 5 to the mobile station 3. The priority of the packet becomes a criterion when assigning a channel for transmitting the packet to the mobile station 3. The priority is set so as to provide a packet that should be assigned a channel and transmitted early with a high priority.

The priority calculation unit 43 includes a retransmission packet priority calculation unit 431, a transmission path situation priority calculation unit 432, a QoS priority calculation unit 433, a transmission waiting time priority calculation unit 434, and a priority unification unit 435. In the present embodiment, a synthetic priority calculated by using a plurality of kinds of information (hereafter referred to as "synthetic priority") is used as priority. The retransmission packet priority calculation unit 431, the transmission path situation priority calculation unit 432, the QoS priority calculation unit 433, and the transmission waiting time priority calculation unit 434 are individual priority calculation units for calculating individual priorities respectively calculated based on each information for calculating priority (hereafter referred to as "individual priorities").

The retransmission packet priority calculation unit 431 calculates priority based on whether the packet is a retransmission packet. The retransmission packet means a packet transmitted to the mobile station 3 again by the radio unit 8 because a packet transmitted once from the base station 2 to the mobile station 3 has not arrived at the mobile station 3 without an error and normally because of some cause in the base station 2, on the transmission path between the base station 2 and the mobile station 3, or in the mobile station 3. The priority calculated based on whether the packet is a retransmission packet is hereafter referred to as "retransmission packet priority". The retransmission packet priority is one of the individual priorities.

Figure 3:
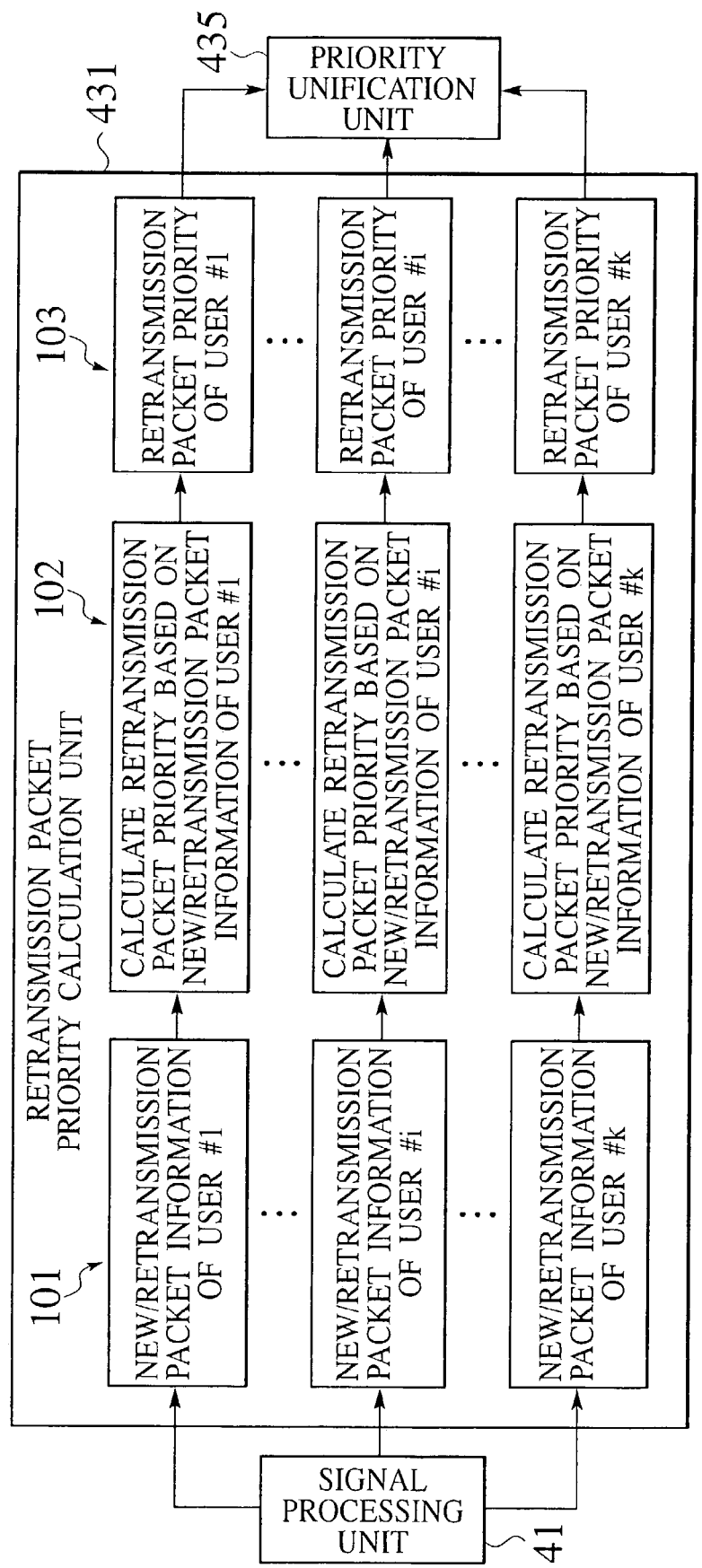
FIG. 3 is a diagram showing a retransmission packet priority calculation unit according to a first embodiment of the present invention.

As shown in FIG. 3, the retransmission packet priority calculation unit 431 first obtains new /retransmission packet information of users #1 to #k in the mobile stations 3 (101). The new/retransmission packet information is information indicating whether a packet having one of users #1 to #k in the mobile stations 3 as its destination is a new packet or a retransmission packet. To be concrete, the retransmission packet priority calculation unit 431 first acquires ACK/NACK information from the signal processing unit 41. If there is a NACK response for a packet having one of users #1 to #k as its destination, then the retransmission packet priority calculation unit 431 judges the packet to be a retransmission packet. On the other hand, if there isn't a NACK response for a packet having one of users #1 to #k as its destination, then the retransmission packet priority calculation unit 431 judges the packet to be anew packet. In this way, the retransmission packet priority calculation unit 431 obtains new/retransmission packet information of the users #1 to #k based on the ACK/NACK information.

The retransmission packet priority calculation unit 431 calculates the retransmission packet priority of a packet having one of users #1 to #k as its destination based on the new/retransmission packet information of the user (102). The retransmission packet priority calculation unit 431 previously sets retransmission packet priority provided in the case of a retransmission packet, and retransmission packet priority provided in the case of a new packet. The retransmission packet priority calculation unit 431 determines whether a packet having each of the users #1 to #k as its destination is a new packet or a retransmission packet, based on the new/ retransmission packet information of the user, provides the packet with the preset retransmission packet priority, and calculates the retransmission packet priority of a packet directed to each of the users #1 to #k. Since capacities of the reception buffer serving as the holding unit of the reception packet in the mobile station 3 and the transmission buffer 6 in the base station 2 are limited, it is preferable to transmit a retransmission packet as soon as possible and with short transmission waiting time. Therefore, it is preferable to set the retransmission packet priority provided for each retransmission packet so as to become higher than other individual priorities.

Finally, the retransmission packet priority calculation unit 431 provides the priority unification unit 435 with the calculated retransmission packet priorities of the users #1 to #k (103). In the case where channel assignment is conducted by using only the retransmission packet priority as priority, the retransmission packet priority calculation unit 431 provides the weight processing unit 44 directly with the calculated retransmission packet priorities of the users #1 to #k. According to such retransmission packet priority calculation unit 431, the control device 4 can conduct channel assignment based on the priority calculated considering whether the packet is a retransmission packet.

The transmission path situation priority calculation unit 432 calculates priority based on the situation of the transmission path formed between the radio unit 8 and the mobile station 3. Priority calculated based on the transmission path situation is hereafter referred to as "transmission path situation priority". The transmission path situation priority is one of the individual priorities. The transmission path situation priority calculation unit 432 may calculate the transmission path situation priority by comparing situations of a plurality of transmission paths formed between the base station 2 and the mobile stations 3 of respective users with each other, or may calculate uniquely for each user based on the situation of the transmission path formed between the base station 2 and the mobile station 3 of the user.

FIG. 4A shows a transmission path situation priority calculation unit 432a in the case where the transmission path situation priority is calculated by comparing situations of a plurality of transmission paths formed between the base station 2 and the mobile stations 3 of respective users with each other. FIG. 4B shows a transmission path situation priority calculation unit 432b in the case where the transmission path situation priority is calculated uniquely for each user based on the situation of the transmission path formed between the base station 2 and the mobile station 3 of the user.

As shown in FIGS. 4A and 4B, each of the transmission path situation priority calculation unit 432a and the transmission path situation priority calculation unit 432b first acquires transmission path information of the users #1 to #k of the mobile stations 3 (201a, 201b). As the transmission path information, there are the reception quality and delay profiles in the mobile station 3, throughput such as a transmission rate of transmission of a packet to the mobile station 3 conducted by the radio unit 8, and information concerning transmission power control such as a TPC (Transmit power control) bit transmitted from the mobile station 3.

The transmission path information is contained in the control signal transmitted from the mobile station 3, and taken out from the control signal by the signal processing unit 41. Therefore, each of the transmission path situation priority calculation units 432a and 432b acquires the transmission path information from the signal processing unit 41. The mobile station 3 obtains the transmission path situation by measuring the reception quality or obtaining the transmission rate, and transmits the transmission path situation to the base station 2 in an up control channel. Each of the transmission path situation priority calculation units 432a and 432b may use the transmission path information acquired from the signal processing unit 41 as it is, or may predict a transmission path situation at timing of transmission of a packet and use a value obtained by the prediction. Or each of the transmission path situation priority calculation units 432a and 432b may acquire transmission path situations of a plurality of kinds, and calculate the transmission path situation priority by combining the transmission path situations.

As indices indicating the reception quality, there are, for example, the SIR (Signal to Interference Power Ratio), CIR (Carrier to interference Power Ratio), SNR (Signal to Noise Power Ratio), Eb/No (Bit Energy per Noise), and desired wave signal power. The SIR is a ratio of signal power to interference wave power. In the case where CDMA is used as an access scheme, a ratio of signal power to interference wave power after despreading processing can be used as the SIR. The CIR is a ratio of desired wave signal power to interference wave power. As the CIR, a ratio of desired wave signal power to interference wave power and noise power can be used, considering noise power in a receiver of the mobile station 3. In the case where CDMA is used as an access scheme, a ratio of desired wave signal power to interference wave power and noise power on a pilot channel can be used. The SNR is a ratio of signal power to noise power. The Eb/No is a ratio of signal power to noise power per bit. The delay profile in a mobile station 3 means a graph obtained by plotting a delay time of electric wave arriving at the mobile station 3 on the abscissa and plotting received power of each electric wave in the mobile station 3 on the ordinate. The delay profile in a mobile station 3 is thus a diagram showing a relation between the delay time and received power of the electric wave.

In the case where an interference removal circuit such as an interference canceller is used in a receiver of the mobile station 3, an interference wave removal effect differs according to a ratio of a component of interference wave power from a cell in which the mobile station 3 has conducted location registration to an interference wave power component and a ratio of a component of interference wave power from other cells to the interference wave power component. Therefore, it is preferable that each of the transmission path situation priority calculation units 432a and 432b acquires the ratio of the component of interference wave power from the cell in which the mobile station 3 has conducted location registration to the interference wave power component and the ratio of the component of interference wave power from other cells to the interference wave power component, and calculate the CIR and SIR by considering the ratios. By the way, a ratio between the ratio of the component of interference wave power from the cell in which the mobile station 3 has conducted location registration to the interference wave power component and the ratio of the component of interference wave power from other cells to the interference wave power component is referred to as Ior/Ioc.

In the case where beam forming is conducted in order to suppress electric wave interference by using an adaptive array antenna as the antenna 9, directing an antenna beam to the mobile station 3, and directing the null of the antenna beam to an interfering mobile station, the mobile station 3 cannot directly obtain the actual reception quality even if the CIR and SIR are calculated by using the actual signal power, interference wave power, desired wave signal power, and noise power. Therefore, it is preferable to conduct computation in the mobile station 3, the signal processing unit 41, and the transmission path situation priority calculation units 432a or 432b in order to correct the CIR and SIR calculated by using the actual signal power, interference wave power, desired wave signal power, and noise power and obtain the actual CIR and SIR. Each of the transmission path situation priority calculation units 432a and 432b may acquire a TPC command from the signal processing unit 41 as transmission path information, and use an estimate value of the CIR estimated based on the TPC command.

Furthermore, each of the transmission path situation priority calculation units 432a and 432b can calculate the transmission path situation priority by using, as the reception quality, a reception quality at a point in past time, a reception quality at a time point at which the mobile station 3 obtains the reception quality, a reception quality at a time point at which the radio unit 8 transmits a packet that is predicted from variation of the past reception quality, an average value of the reception quality over a certain past period of time, an average value of the reception quality over a period of time including a time point at which the mobile station 3 obtains the reception quality, and an average value of the reception quality over a period of time including a time point at which the radio unit 8 transmits a packet that is predicted from variation of the past reception quality. Therefore, each of the transmission path situation priority calculation units 432a and 432b acquires such reception qualities as transmission path information.

Furthermore, each of the transmission path situation priority calculation units 432a and 432b can calculate the transmission path situation priority by using, as the reception quality, a difference between values of two or more than reception qualities selected from among a reception quality at a point in past time, a reception quality at a time point at which the mobile station 3 obtains the reception quality, a reception quality at a time point at which the radio unit 8 transmits a packet that is predicted from variation of the past reception quality, an average value of the reception quality over a certain past period of time, an average value of the reception quality over a period of time including a time point at which the mobile station 3 obtains the reception quality, and an average value of the reception quality over a period of time including a time point at which the radio unit 8 transmits a packet that is predicted from variation of the past reception quality. When thus obtaining the difference between reception qualities, each of the transmission path situation priority calculation units 432a and 432b can calculate the transmission path situation priority while considering variations such as improvement or degradation of the reception quality. Therefore, each of the transmission path situation priority calculation units 432a and 432b acquires such reception qualities as transmission path information.

Furthermore, each of the transmission path situation priority calculation units 432a and 432b can calculate the transmission path situation priority by using, as the throughput such as the transmission rate, a transmission rate at a point in past time, a transmission rate at a time point at which the mobile station 3 obtains the reception quality, a transmission rate at a time point at which the radio unit 8 transmits a packet that is predicted from variation of the past reception quality, an average value of the transmission rate over a certain past period of time, and an average value of the transmission rate over a period of time including a time point at which the radio unit 8 transmits a packet that is predicted from variation of the past reception quality. Therefore, each of the transmission path situation priority calculation units 432a and 432b acquires such transmission rates as transmission path information.

Furthermore, each of the transmission path situation priority calculation units 432a and 432b can calculate the transmission path situation priority by using, as the throughput such as the transmission rate, a difference between values of two or more than reception qualities selected from among a transmission rate at a point in past time, a transmission rate at a time point at which the mobile station 3 obtains the reception quality, a transmission rate at a time point at which the radio unit 8 transmits a packet that is predicted from variation of the past reception quality, an average value of the transmission rate over a certain past period of time, and an average value of the transmission rate over a period of time including a time point at which the radio unit 8 transmits a packet that is predicted from variation of the past reception quality. When thus obtaining the difference between transmission rates, each of the transmission path situation priority calculation units 432a and 432b can calculate the transmission path situation priority while considering variations such as improvement or degradation of the transmission rate. Therefore, each of the transmission path situation priority calculation units 432a and 432b acquires such transmission rates as transmission path information.

Each of the transmission path situation priority calculation units 432a and 432b conducts weighting on acquired transmission path information of the users #1 to #k (202a, 202b). Each of the transmission path situation priority calculation units 432a and 432b conducts weighting on the CIR, SIR, and the transmission rate. Each of the transmission path situation priority calculation units 432a and 432b can set weights according to the reception quality, such as the CIR and SIR, and the transmission rate. For example, each of the transmission path situation priority calculation units 432a and 432b can set a weight so as to make the transmission path information large and provide high priority for a user who is large in the SIR or CIR, or a user who is small in the transmission rate. As for the weighting, the transmission path information may be made large by adding a weight having a positive value or multiplying a weight having a value greater than unity. On the contrary, the transmission path information may be made small by adding a weight having a negative value or multiplying a weight having a value less than unity.

Furthermore, in the case where a plurality of kinds of transmission path information are used, each of the transmission path situation priority calculation units 432a and 432b may provide respective kinds of transmission path information with different weights. For example, each of the transmission path situation priority calculation units 432a and 432b may conduct weighting by setting weights so as to make transmission path information desired to be made more of larger when calculating the priority. Each of the transmission path situation priority calculation units 432a and 432b may not conduct weighting on the transmission path information.

As shown in FIG. 4A, the transmission path situation priority calculation unit 432a then compares the transmission path information of the users #1 to #k, and calculates transmission path situation priorities of packets to be transmitted to the users #1 to #k (203a). For example, the transmission path situation priority calculation unit 432a provides users with order in order of decreasing CIR based on CIRs of the users #1 to #k. And the transmission path situation priority calculation unit 432a calculates the transmission path situation priorities of the users #1 to #k so as to make the transmission path situation priority of a user early in order high and make the transmission path situation priority of a user late in order low.

Furthermore, for example, the transmission path situation priority calculation unit 432a provides users with order in order of decreasing transmission rate based on transmission rates of the users #1 to #k. And the transmission path situation priority calculation unit 432a calculates the transmission path situation priorities of the users #1 to #k so as to make the transmission path situation priority of a user early in order high and make the transmission path situation priority of a user late in order low.

On the other hand, as shown in FIG. 4B, the transmission path situation priority calculation unit 432b uniquely calculates transmission path situation priorities respectively of packets to be transmitted to the users #1 to #k based on transmission path information of the users #1 to #k (203b). For example, the transmission path situation priority calculation unit 432b previously sets a plurality of numerical value ranges of CIR and transmission path situation priorities in the case where the CIR is in the ranges. And the transmission path situation priority calculation unit 432b judges in which numerical value range the CIR of each of the users #1 to #k exists, and calculates a value set as transmission path situation priority in the case where the CIR is in that numerical value range, as the transmission path situation priority of the user.

For example, if the CIR of the user #i is in the numerical value range between CIR(n) and CIR(n+1) (where "n" is a natural number, and it represents an order of a numerical value that defines a numerical value range). In other words, if the relation $CIR(n) \leq CIR$ of user #i<$CIR(n+1)$ is satisfied, then a value "A" previously set as transmission path situation priority for the case where the CIR is in that numerical value range is selected as transmission path situation priority. In this case, the transmission path situation priority is set equal to A irrespective of CIRs of other users.

Finally, each of the transmission path situation priority calculation units 432a and 432b provides the priority unification unit 435 with the calculated transmission path situation priorities respectively of the users #1 to #k (204a, 204b). In the case where channel assignment is conducted by using only the transmission path situation priority as the priority, each of the transmission path situation priority calculation units 432a and 432b provides directly the weight processing unit 44 with the calculated transmission path situation priorities of the users #1 to #k.

According to the transmission path situation priority calculation units 432a and 432b, the control device 4 can conduct channel assignment based on the priority calculated considering the transmission path situation, such as the transmission rate on the transmission path and the reception quality in the mobile station 3. For example, in the case where each of the transmission path situation priority calculation units 432a and 432b has calculated the priority by using the reception quality as the transmission path situation, therefore, the base station 2 can implement highly efficient packet transmission and improvement of the reception quality. In the case where each of the transmission path situation priority calculation units 432a and 432b has calculated the priority by using the transmission rate as the transmission path situation, the base station 2 can prevent inclination to transmission to a specific mobile station 3, keep fairness in giving an opportunity of communication to a plurality of mobile stations 3, and contribute to shorten the delay time as well.

Figure 5B:
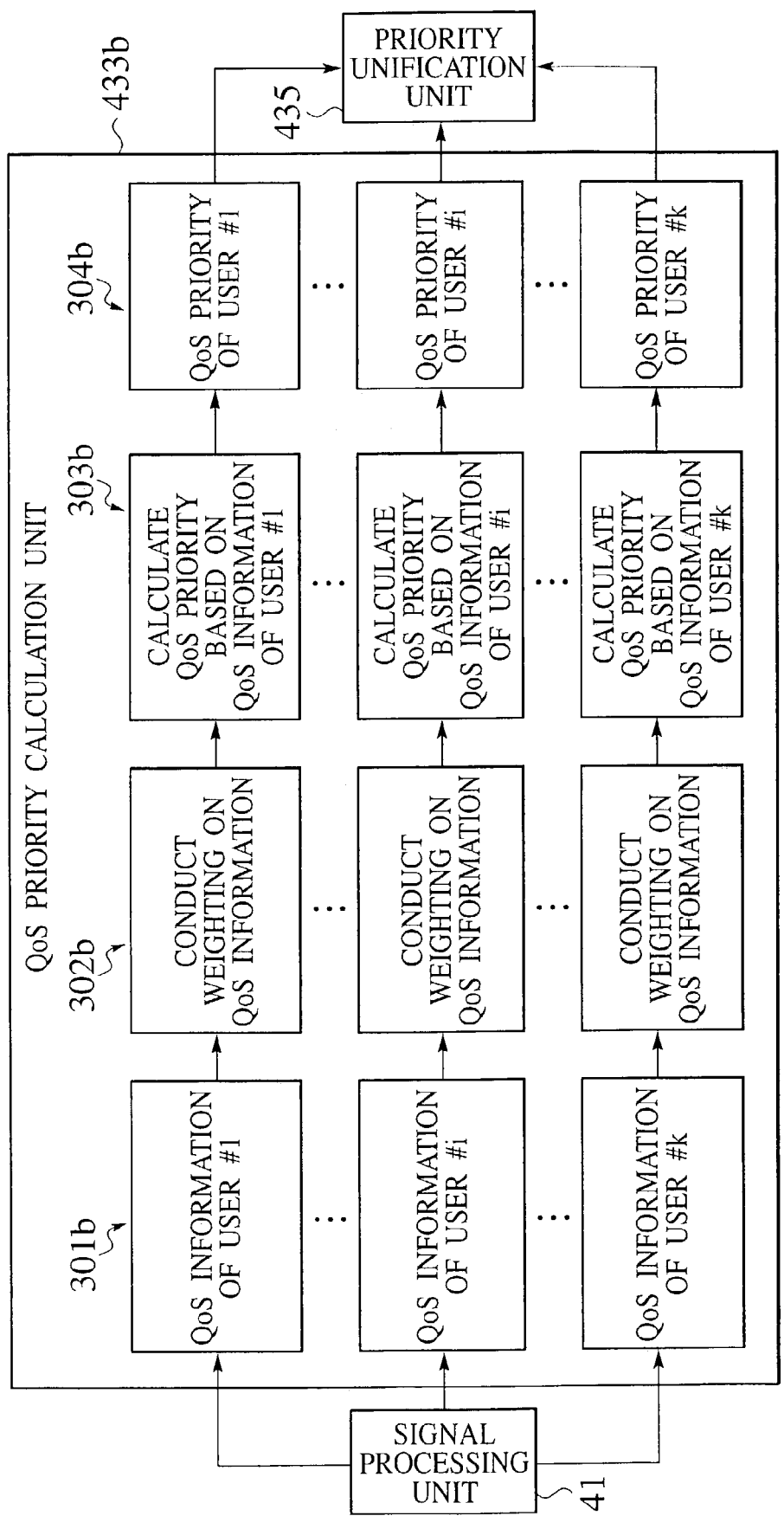

The QoS priority calculation unit 433 calculates the priority based on the QoS of a packet. Priority calculated based on QoS is hereafter referred to as "QoS priority". The QoS priority is one of the individual priorities. The QoS priority calculation unit 433 may calculate QoS by comparing QoS values of packets transmitted to respective users with each other, or may calculate uniquely for each user based on QoS of a packet transmitted to each user. FIG. 5A shows a QoS priority calculation unit 433a in the case where QoS is calculated by comparing QoS values of packets transmitted to respective users with each other. FIG. 5B shows a QoS priority calculation unit 433b in the case where QoS is calculated uniquely for each user based on QoS of a packet transmitted to each user.

As shown in FIGS. 5A and 5B, each of the QoS priority calculation units 433a and 433b acquires QoS information of packets directed to the users #1 to #k of the mobile stations 3 (301a, 301b). As the QoS information of a packet, there are the permissible delay time of data contained in the packet, the class of service utilized for transmission of the packet, and the QoS-assured transmission rate. Each of the QoS priority calculation units 433a and 433b acquires QoS information of packets from the signal processing unit 41.

Each of the QoS priority calculation units 433a and 433b conducts weighting on acquired QoS information of the users #1 to #k (302a, 302b). Each of the QoS priority calculation units 433a and 433b conducts weighting on the numerical values of the permissible delay time or the like, or provides weights according to the service class. Each of the QoS priority calculation units 433a and 433b can set weights according to the permissible delay time or the service class. For example, each of the QoS priority calculation units 433a and 433b can set a weight so as to make the QoS information large and provide high priority for a user who is short in permissible delay time, or a user who utilizes service in which the real time property is needed, such as voice communication service or dynamic image communication service. As for the weighting, the QoS information may be made large by adding a weight having a positive value or multiplying a weight having a value greater than unity. On the contrary, the QoS information may be made small by adding a weight having a negative value or multiplying a weight having a value less than unity.

Furthermore, in the case where a plurality of kinds of QoS information are used, each of the QoS priority calculation units 433a and 433b may provide respective kinds of QoS information with different weights. For example, each of the QoS priority calculation units 433a and 433b may conduct weighting by setting weights so as to make QoS information desired to be thought much of, larger when calculating the priority. Each of the QoS priority calculation units 433a and 433b may not conduct weighting on the QoS information.

As shown in FIG. 5A, the QoS priority calculation unit 433a then compares the QoS information of the users #1 to #k, and calculates QoS priorities of packets to be transmitted to the users #1 to #k (303a). For example, the QoS priority calculation unit 433a provides users with order in order of increasing permissible delay time based on permissible delay time of the users #1 to #k. And the QoS priority calculation unit 433a calculates the QoS priorities of the users #1 to #k so as to make the QoS priority of a user early in order high and make the QoS priority of a user late in order low.

Furthermore, for example, the QoS priority calculation unit 433a provides users with order in order of decreasing QoS-assured transmission rate based on QoS-assured transmission rates of the users #1 to #k. And the QoS priority calculation unit 433a calculates the QoS priorities of the users #1 to #k so as to make the QoS priority of a user early in order high and make the QoS priority of a user late in order low.

On the other hand, as shown in FIG. 5B, the QoS priority calculation unit 433b uniquely calculates QoS priorities respectively of packets to be transmitted to the users #1 to #k based on QoS information of the users #1 to #k (303b). For example, the QoS priority calculation unit 433b previously sets a plurality of numerical value ranges of the permissible delay time and QoS priorities in the case where the permissible delay time is in the ranges. And the QoS priority calculation unit 433b judges in which numerical value range the permissible delay time of each of the users #1 to #k exists, and calculates a value set as QoS priority in the case where the permissible delay time is in that numerical value range, as the QoS priority of the user.

For example, if the permissible delay time of the user #i is in the numerical value range between permissible delay time (n) and permissible delay time (n+1) (where "n" is a natural number, and it represents an order of a numerical value that defines a numerical value range). In other words, if the relation permissible delay time (n)≦permissible delay time of user #i<permissible delay time (n+1) is satisfied, then a value B previously set as QoS priority for the case where the permissible delay time is in that numerical value range is selected as QoS priority. In this case, the QoS priority is set equal to "B" irrespective of permissible delay time values of other users.

Furthermore, for example, the QoS priority calculation unit 433b previously sets a plurality of numerical value ranges of the QoS-assured transmission rate and QoS priorities in the case where the QoS-assured transmission rate is in the ranges. And the QoS priority calculation unit 433b judges in which numerical value range the QoS-assured transmission rate of each of the users #1 to #k exists, and calculates a value set as QoS priority in the case where the QoS-assured transmission rate is in a numerical value range, as the QoS priority of the user. In this case as well, the QoS priority calculation unit 433b can calculate the QoS priority irrespective of QoS-assured transmission rates of other users.

Finally, each of the QoS priority calculation units 433a and 433b provides the priority unification unit 435 with the calculated QoS priorities respectively of the users #1 to #k (304a, 304b). In the case where channel assignment is conducted by using only the QoS priority as the priority, each of the QoS priority calculation units 433a and 433b provides directly the weight processing unit 44 with the calculated QoS priorities of the users #1 to #k.

According to the QoS priority calculation units 433a and 433b, the control device 4 can conduct channel assignment based on the priority calculated considering the qualities of service of packets. As a result, the base station 2 can cope with QoS such as a delay time required for transmission of data (medium) contained in a packet.

Figure 6A:
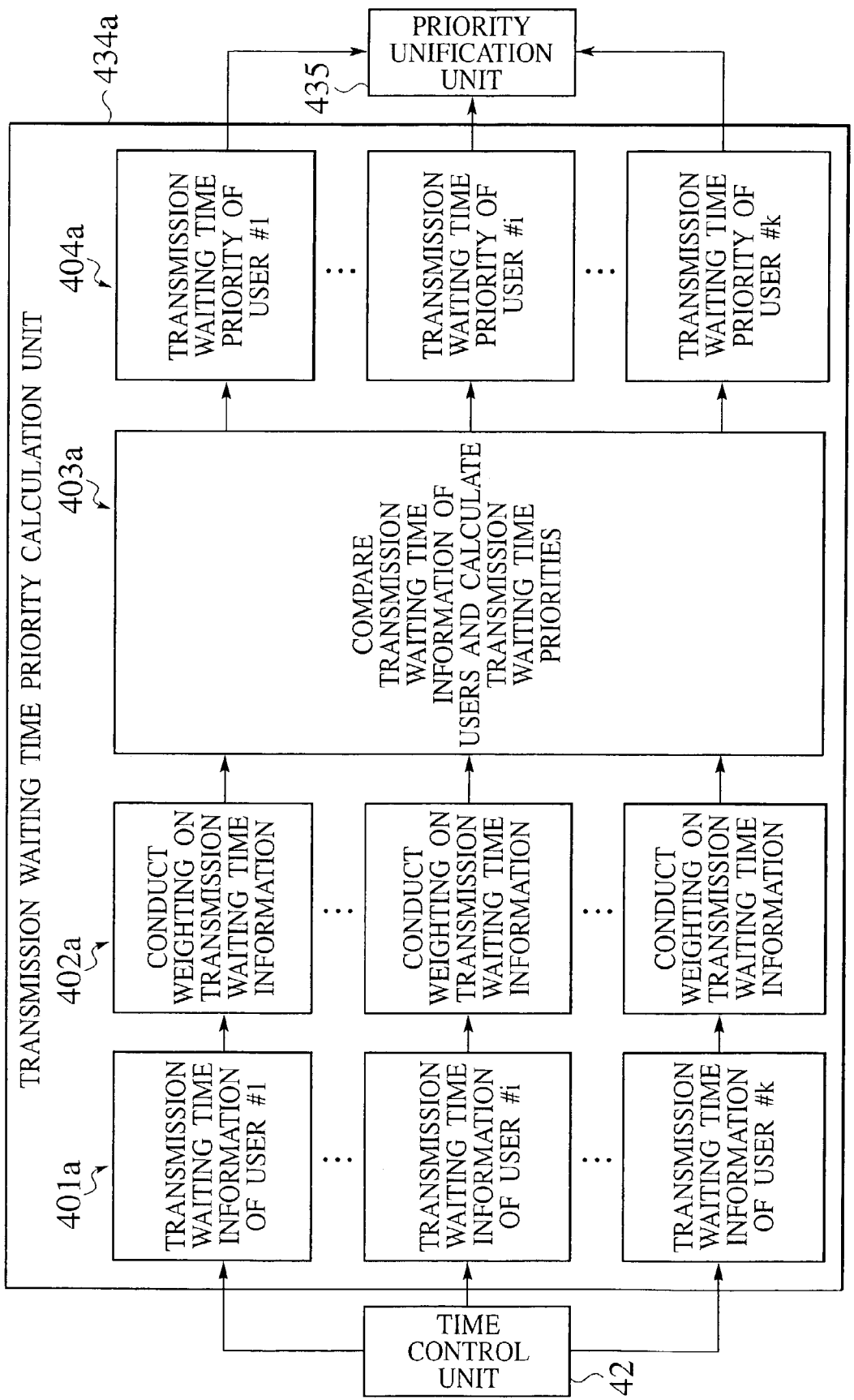
FIGS. 6A and 6B are diagrams showing a transmission waiting time priority calculation unit according to a first embodiment of the present invention.
Figure 6B:
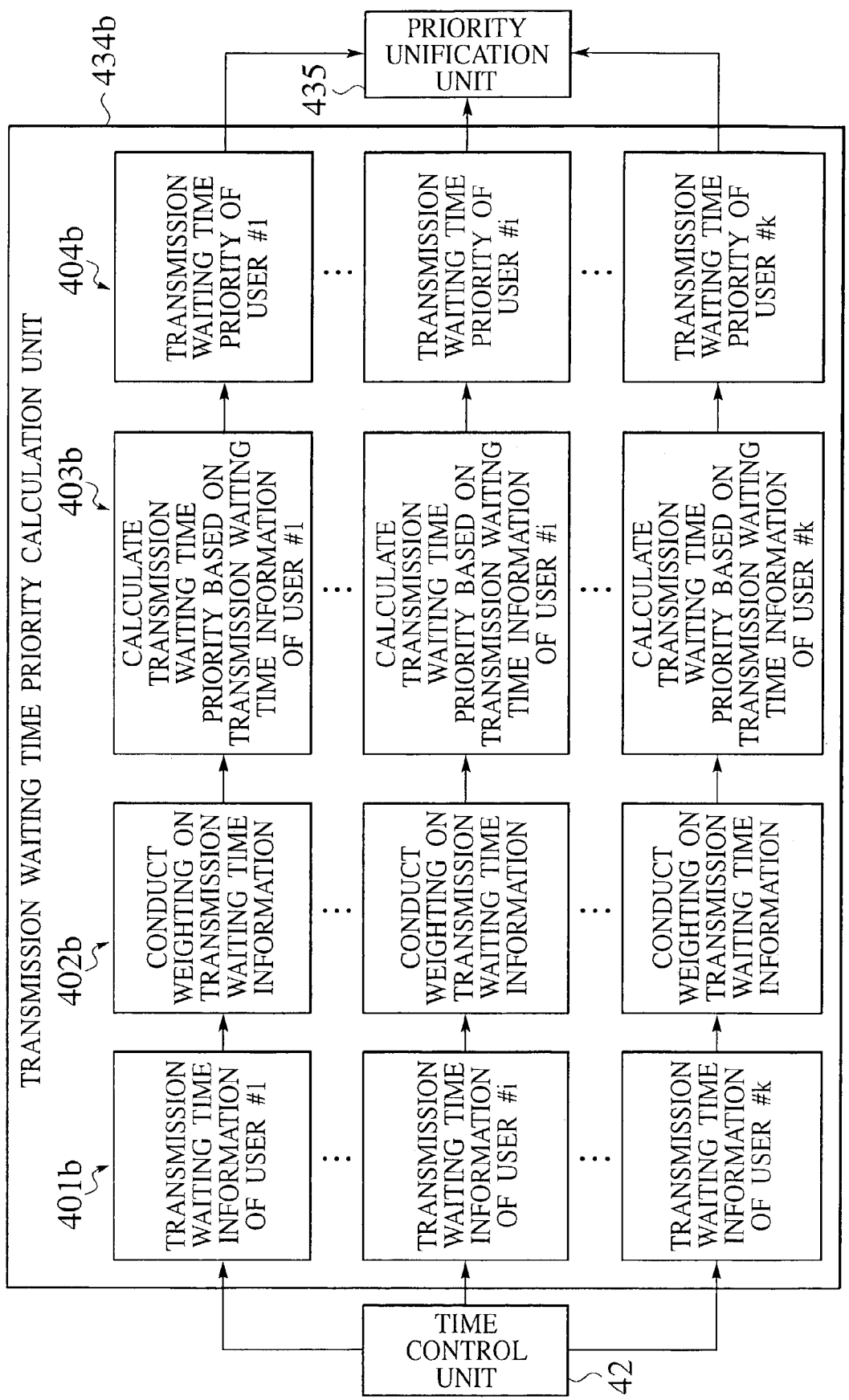

The transmission waiting time priority calculation unit 434 calculates the priority based on the transmission waiting time of a packet. Priority calculated based on transmission waiting time is hereafter referred to as "transmission waiting time priority". The transmission waiting time priority is one of the individual priorities. The transmission waiting time priority calculation unit 434 may calculate transmission waiting time priority by comparing transmission waiting time values of packets transmitted to respective users with each other, or may calculate uniquely for each user based on transmission waiting time values of packets transmitted to respective users. FIG. 6A shows a transmission waiting time priority calculation unit 434a in the case where transmission waiting time priority is calculated by comparing transmission waiting time values of packets transmitted to respective users with each other. FIG. 6B shows a transmission waiting time priority calculation unit 434b in the case where transmission waiting time priority is calculated uniquely for each user based on a transmission waiting time value of a packet transmitted to each user.

As shown in FIGS. 6A and 6B, each of the transmission waiting time priority calculation units 434a and 434b acquires transmission waiting time information of packets directed to the users #1 to #k of the mobile stations 3 (401a, 401b). Each of the transmission waiting time priority calculation units 434a and 434b acquires transmission waiting time information from the time control unit 42. Each of the transmission waiting time priority calculation units 434a and 434b conducts weighting on acquired transmission waiting time information of the users #1 to #k (402a, 402b). Each of the transmission waiting time priority calculation units 434a and 434b conducts weighting on the transmission waiting time. Each of the transmission waiting time priority calculation units 434a and 434b can set weights according to the transmission waiting time. For example, each of the transmission waiting time priority calculation units 434a and 434b can set a weight so as to make the transmission waiting time information large and provide high priority for a user who is large in transmission waiting time.

As for the weighting, the transmission waiting time information may be made large by adding a weight having a positive value or multiplying a weight having a value greater than unity. On the contrary, the transmission waiting time information may be made small by adding a weight having a negative value or multiplying a weight having a value less than unity. Each of the transmission waiting time priority calculation units 434a and 434b may not conduct weighting on the transmission waiting time information.

As shown in FIG. 6A, the transmission waiting time priority calculation unit 434a then compares the transmission waiting time information of the users #1 to #k, and calculates transmission waiting time priorities of packets to be transmitted to the users #1 to #k (403a). For example, the transmission waiting time priority calculation unit 434a provides users with order in order of decreasing transmission waiting time based on transmission waiting time values of the users #1 to #k. And the transmission waiting time priority calculation unit 434a calculates the transmission waiting time priorities of the users #1 to #k so as to make the transmission waiting time priority of a user early in order high and make the transmission waiting time priority of a user late in order low.

On the other hand, as shown in FIG. 6B, the transmission waiting time priority calculation unit 434b uniquely calculates transmission waiting time priorities respectively of packets to be transmitted to the users #1 to #k based on transmission waiting time information of the users #1 to #k (403b). For example, the transmission waiting time priority calculation unit 434b previously sets a plurality of numerical value ranges of the transmission waiting time and transmission waiting time priorities in the case where the transmission waiting time is in the ranges. And the transmission waiting time priority calculation unit 433b judges in which numerical value range the transmission waiting time of each of the users #1 to #k exists, and calculates a value set as transmission waiting time priority in the case where the transmission waiting time is in the numerical value range, as the transmission waiting time of the user.

For example, if the transmission waiting time of the user #i is in the numerical value range between transmission waiting time (n) and transmission waiting time (n+1) (where "n" is a natural number, and it represents an order of a numerical value that defines a numerical value range). In other words, if the relation transmission waiting time (n)≦transmission waiting time of user #i<transmission waiting time (n+1) is satisfied, then a value "C" previously set as transmission waiting time for the case where the transmission waiting time is in that numerical value range is selected as transmission waiting time priority. In this case, the transmission waiting time priority is set equal to "C" irrespective of transmission waiting time values of other users.

Finally, each of the transmission waiting time priority calculation units 434a and 434b provides the priority unification unit 435 with the calculated transmission waiting time priorities respectively of the users #1 to #k (404a, 404b). In the case where channel assignment is conducted by using only the transmission waiting time priority as the priority, each of the transmission waiting time priority calculation units 434a and 434b provides directly the weight processing unit 44 with the calculated transmission waiting time priorities of the users #1 to #k.

According to the transmission waiting time priority calculation units 434a and 434b, the control device 4 can conduct channel assignment based on the priority calculated considering transmission waiting time values of packets. As a result, the base station 2 can prevent inclination to transmission to a specific mobile station 3, keep fairness in giving an opportunity of communication to a plurality of mobile stations 3, and contribute to shorten the delay time as well.

The priority unification unit 435 unifies a plurality of individual priorities calculated by a plurality of individual priority calculation units and determines the synthetic priority. In other words, the priority unification unit 435 evaluates the individual priorities synthetically, and determines the synthetic priority. In the present embodiment, the retransmission packet priority, the transmission path situation priority, the Qos priority, and the transmission waiting time priority are used as the individual priorities, and the synthetic priority is determined by unifying them.

The priority unification unit 435 acquires the retransmission packet priority, the transmission path situation priority, the QoS priority, and the transmission waiting time priority respectively from the retransmission packet priority calculation unit 431, the transmission path situation priority calculation unit 432, the QoS priority priority calculation unit 433, and the transmission waiting time priority calculation unit 434 as the individual priorities. The priority unification unit 435 determines the synthetic priority by multiplying acquired individual priorities respectively by coefficients, and adding up the individual priorities respectively multiplied by the coefficients. Denoting the retransmission packet priority by "v", the transmission path situation priority by "x", the QoS priority by "y", and the transmission waiting time priority by "z", the coefficient for the retransmission packet priority by "a", the coefficient for the transmission path situation priority by "b", the coefficient for the QoS priority by "c", and the coefficient for the transmission waiting time priority by "d" (where "a" to "d" are positive real numbers), the synthetic priority can be calculated by the following equation (1).

$$av+bx+cy+dz \quad (1)$$

The coefficients "a" to "d" may be set as fixed values in each base station 2, or may be determined according to the situation and varied adaptively according to the situation. If the priority unification unit 435, for example, sets the coefficient "b" for the transmission path situation priority as a fixed value greater than other coefficients "a", "c", and "d", or makes the coefficient "b" change so as to become greater than other coefficients "a", "c", and "d", then the control device 4 can conduct channel assignment while thinking much of the transmission path situation and giving priority to the transmission path situation. For example, if the transmission path situation priority calculation unit 432 has calculated the transmission path situation priority based on the transmission rate, therefore, then it becomes possible to further enhance the fairness in giving an opportunity of communication to a plurality of mobile stations 3, and greatly contribute to shorten the delay time as well.

If the priority unification unit 435 sets the coefficient "d" for the transmission waiting time priority as a fixed value greater than other coefficients "a", "b", and "c", or make the coefficient "a" change so as to become greater than other coefficients "a", "b", and "c", then the control device 4 can conduct channel assignment while thinking much of the transmission waiting time situation and giving priority to the transmission waiting time. Therefore, the base station 2 can further enhance the fairness in giving an opportunity of communication to a plurality of mobile stations 3, and greatly contribute to shorten the delay time as well.

Since capacities of the reception buffer in the mobile station 3 and the transmission buffer 6 in the base station 2 are limited, it is preferable to transmit a retransmission packet as soon as possible and with short transmission waiting time. Therefore, it is preferable that the priority unification unit 435 sets the coefficient "a" for the retransmission packet priority as a fixed value greater than other coefficients "b", "c", and "d", or make the coefficient "a" change so as to become greater than other coefficients "b", "c", and "d".

In this way, the priority unification unit 435 can freely change the condition of calculating the synthetic priority by changing the setting of fixed values of the coefficients "a" to "d" or determining the coefficients "a" to "d" according to the situation. Especially, the priority unification unit 435 can easily calculate the synthetic priority with information desired to be regarded as important thought much of, by setting the fixed values of the coefficients "a" to "d" or determining the coefficients "a" to "d" according to the situation so as to increase the coefficients of the individual priorities obtained based on information desired to be thought much of, when calculating the synthetic priority. As for individual priority judged to be unnecessary to consider, the priority unification unit 435 can set its coefficient equal to "0".

The priority unification unit 435 can determine the coefficients "a" to "d" according to, for example, the traffic situation in the base station 2. In the traffic situation, there are the number of mobile stations 3 connected to the radio unit 8 via formed transmission paths, service classes used by the mobile stations 3, a quantity of packets stored in the transmission buffer 6. The priority unification unit 435 acquires the traffic situation periodically or when determining the coefficients. The priority unification unit 435 acquires the traffic situation by, for example, receiving a notice of the number of mobile stations 3 connected to the radio unit 8 issued by the radio unit 8, checking the packet quantity stored in the transmission buffer 6, or acquiring the service class from QoS information acquired from the signal processing unit 41.

For example, in the case where there is much traffic, such as in the case where the number of the mobile stations connected to the radio unit 8 is large, or in the case where the quantity of packets stored in the transmission buffer 6 is large, the packet delay time and the transmission waiting time increase. In that case, the synthetic unification unit 435 can calculate the synthetic priority with the QoS priority and the transmission waiting time priority thought much of, by making the coefficient "c" of the QoS priority or the coefficient "d" of the transmission waiting time priority large. Therefore, the base station 2 can meet the request of the permissible delay time and keep the fairness in opportunity of communication between mobile stations 3.

In the case where there is less traffic, such as in the case where the number of the mobile stations connected to the radio unit 8 is small, or in the case where the quantity of packets stored in the transmission buffer 6 is small, a margin often occurs in the packet delay time and the transmission waiting time. In that case, the synthetic unification unit 435 can calculate the synthetic priority with the transmission path situation priority thought much of, by making the coefficient "b" of the transmission path situation priority large. Therefore, the base station 2 can improve the reception quality while satisfying the permissible delay time of packets and keeping the fairness in opportunity of communication between mobile stations 3.

Furthermore, the priority unification unit 435 may determine the coefficients "a" to "d" according to the transmission rate of packets. The priority unification unit 435 can determine the coefficients "a" to "d" by determining a desired value of the transmission rate (hereafter referred to "desired transmission rate") and comparing an actual transmission rate with the desired transmission rate. The priority unification unit 435 can set the desired transmission rate equal to the QoS-assured transmission rate or a transmission rate determined based on the QoS-assured transmission rate. Furthermore, the priority unification unit 435 can set the desired transmission rate equal to a transmission rate that the communication system 1 assures a user of the mobile station 3 of (hereafter referred to as "system-assured transmission rate") or a transmission rate determined based on the system-assured transmission rate. The transmission rate that the communication system 1 assures the user of is arranged by a contract or the like between a common carrier who runs the communication system 1 and provides communication service and the user of the mobile station 3 when, for example, the user enters for the communication service. Furthermore, the priority unification unit 435 can set the desired transmission rate equal to a transmission rate that each base station arbitrarily sets and assures the user of the mobile station 3 of (hereafter referred to as "base station assured transmission rate"). Hereafter, QoS-assured transmission rate, the system-assured transmission rate, and the base station assured transmission rate are referred to collectively as "assured transmission rate".

The priority unification unit 435 acquires an actual transmission rate to the mobile station 3 of the user of packet transmission destination from the signal processing unit 41 as the transmission path information. In the case where the QoS-assured transmission rate or a transmission rate determined based on the QoS-assured transmission rate is used as the desired transmission rate, the priority unification unit 435 acquires QoS information of the packet from the signal processing unit 41 and determines the desired transmission rate. In the case where the system-assured transmission rate or a transmission rate determined based on the system-assured transmission rate is used as the desired transmission rate, the priority unification unit 435 associates transmission destination user identification data with the system-assured transmission rate the user is assured of and the desired transmission rate determined based on the system-assured transmission rate, and holds them. And the priority unification unit 435 acquires the transmission destination user identification data of a packet from the signal processing unit 41, and acquires a desired transmission rate of the transmission destination user identification data. In the case where the base station assured transmission rate is used as the desired transmission rate, the priority unification unit 435 holds the base station assured transmission rate.

And the priority unification unit 435 compares the actual transmission rate with the desired transmission rate, and obtains the difference between the actual transmission rate and the desired transmission rate, or the ratio of the actual transmission rate to the desired transmission rate. The priority unification unit 435 determines the coefficients by using the difference between the actual transmission rate and the desired transmission rate, or the ratio of the actual transmission rate to the desired transmission rate. For example, if the difference between the actual transmission rate and the desired transmission rate, or the ratio of the actual transmission rate to the desired transmission rate is great, then the priority unification unit 435 calculates the synthetic priority with the transmission path situation priority thought much of, by making the coefficient "b" of the transmission path situation priority large. As a result, it becomes possible to give priority to transmission to a mobile station 3 that is low in transmission rate, enhance the fairness in giving an opportunity of communication to a plurality of mobile stations 3, and greatly contribute to shorten the delay time as well.

The priority unification unit 435 may determine the coefficients "a" to "d" according to the delay time of the packet. The priority unification unit 435 can determine the coefficients "a" to "d" by determining a desired value of the delay time (hereafter referred to as "desired delay time") and comparing the actual delay time with the desired delay time. The priority unification unit 435 can set the desired delay time equal to the permissible delay time contained in QoS information or a delay time determined based on the permissible delay time. Furthermore, the priority unification unit 435 can set the desired delay time equal to the delay time that the communication system 1 assures the user of the mobile station 3 of (hereafter referred to as "system-assured delay time") or a delay time determined based on the system-assured delay time. As described above, the delay time that the communication system 1 assures the user of is arranged by a contract or the like between a common carrier who runs the communication system 1 and provides communication service and the user of the mobile station 3 when, for example, the user enters for the communication service. Furthermore, the priority unification unit 435 can set the desired delay time equal to delay time that each base station arbitrarily sets and assures the user of the mobile station 3 of (hereafter referred to as "base station assured delay time").

The priority unification unit 435 acquires packet delay time from the time control unit 42. In the case where the permissible delay time contained in QoS information or delay time determined based on the permissible delay time is used as the desired delay time, the priority unification unit 435 acquires QoS information of the packet from the signal processing unit 41, and determines the desired delay time. In the case where the system-assured delay time or delay time determined based on the system-assured delay time is used as the desired delay time, the priority unification unit 435 associates the transmission destination user identification data with the system-assured delay time that the user is assured of or the desired delay time determined based on the system-assured delay time, and holds them. And the priority unification unit 435 acquires the transmission destination user identification data of the packet from the signal processing unit 41, and acquires the desired delay time of the transmission destination user identification data. In the case where the base station assured delay time is used as the desired delay time, the priority unification unit 435 holds the base station assured delay time.

And the priority unification unit 435 compares the actual delay time with the desired delay time, and obtains the difference between the actual delay time and the desired delay time, or the ratio of the actual delay time to the desired delay time. The priority unification unit 435 determines the coefficients by using the difference between the actual delay time and the desired delay time, or the ratio of the actual delay time to the desired delay time. For example, if the difference between the actual delay time and the desired delay time, or the ratio of the actual delay time to the desired delay time is great, then the priority unification unit 435 calculates the synthetic priority with the QoS priority thought much of by making the coefficient "c" of the QoS priority large. As a result, it becomes possible to give priority to transmission of a packet that is great in delay time and that is less in margin for the desired delay time, and meet the QoS request of the packet. In this way, the priority unification unit 435 determines the coefficients "a" to "d" according to the occasional situation. As a result, it is possible to construct a control device 4 capable of adaptively conducting channel assignment according to the traffic situation and the actual situation.

The weight processing unit 44 conducts weighting on the priority of the packet calculated by the priority calculation unit 43. The weight processing unit 44 conducts weighting on the priority calculated once by the priority calculation unit 43 based on situations, such as the transmission rate of a packet transmitted from the radio unit 8 to the mobile station 3, the transmission waiting time and the delay time of the packet, and the reception state of the mobile station 3. It is preferable that the weight processing unit 44 conducts weighting on the priority by stages. As a result, the control device 4 can conduct weighting gradually according to the situation change. The weight processing unit 44 provides the priority comparison unit 45 with the weighted priority.

Figure 7A:
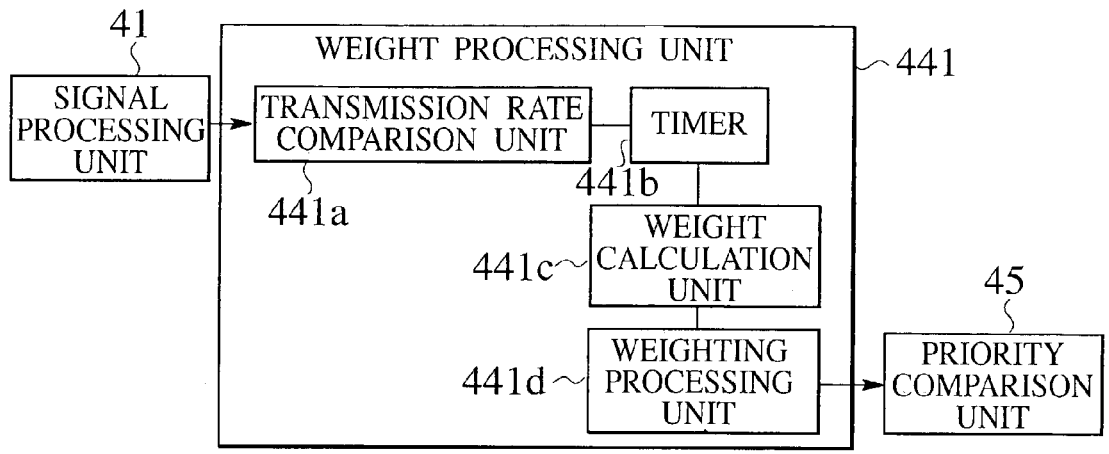
Figure 8A:
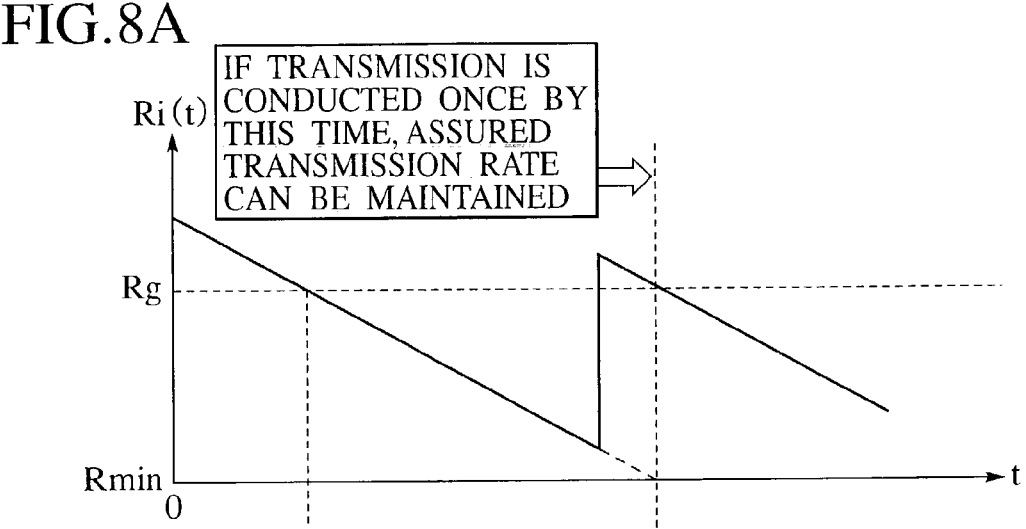
FIGS. 8A and 8B are diagrams showing a weight calculation method according to a first embodiment of the present invention.

FIG. 7A shows a configuration of a weight processing unit 441 for conducting weighting on the priority based on the transmission rate of a packet transmitted from the radio unit 8 to the mobile station 3. The weight processing unit 441 includes a transmission rate comparison unit 441a, a timer 441b, a weight calculation unit 441c, and a weighting processing unit 441d. FIG. 8A is a graph showing a relation between an average value "Ri(t)" of transmission rate and time "t". In FIG. 8A, the ordinate represents the average value "Ri(t)" of transmission rate, and the abscissa represents time "t".

The transmission rate comparison unit 441a compares the actual transmission rate with a prescribed value of the transmission rate determined beforehand (hereafter referred to "prescribed transmission rate"). The prescribed transmission rate can be determined based on the assured transmission rate such as the QoS-assured transmission rate, the system-assured transmission rate, or the base station assured transmission rate. The prescribed transmission rate is a transmission rate serving as a criterion in determining whether weighting for changing the priority should be conducted. Therefore, the prescribed transmission rate that is greater than the assured transmission rate to some degree is set so as to be able to maintain the assured transmission rate. In the present embodiment, a value "Rg" determined by using the assured transmission rate "Rmin" is used as the prescribed transmission rate "Rg" as shown in FIG. 8A.

In the case where a prescribed transmission rate determined based on the QoS-assured transmission rate is used, the transmission rate comparison unit 441a acquires QoS information of the packet from the signal processing unit 41, and determines the prescribed transmission rate. In the case where a prescribed transmission rate determined based on the system-assured transmission rate is used, the transmission rate comparison unit 441a associates transmission destination user identification data with the prescribed transmission rate determined by using the system-assured transmission rate the user is assured of, and holds them. The transmission rate comparison unit 441a acquires the transmission destination user identification data from the signal processing unit 41 and acquires the prescribed transmission rate of the transmission destination user identification data. In the case where a prescribed transmission rate determined based on the base station assured transmission rate is used, the transmission rate comparison unit 441a holds the prescribed transmission rate.

The transmission rate comparison unit 441a acquires the actual rate of transmission to the mobile station 3 of each user, from the signal processing unit 41 from the start time of packet transmission to the mobile station 3 of the user. The actual transmission rate may be a transmission rate measured when the mobile station 3 transmits the control signal to the base station 2, or may be an average value of transmission rates measured in a fixed period of time immediately before the mobile station 3 transmits the control signal to the base station 2. The transmission rate comparison unit 441a may acquire the transmission rate periodically, or acquire the transmission rate continuously. In the present embodiment, the transmission rate comparison unit 441a acquires the average value "Ri(t)" of the transmission rate.

The transmission rate comparison unit 441a compares the actual transmission rate thus acquired with the prescribed transmission rate, and monitors a variation of the transmission rate. If the actual transmission rate becomes less than the prescribed transmission rate, then the transmission rate comparison unit 441a starts the timer 441b. While the actual transmission rate is at least the prescribed transmission rate, the transmission rate comparison unit 441a conducts nothing on the timer 441b and continues to monitor the transmission rate. Upon being started by the transmission rate comparison unit 441a, the timer 441b starts measurement of time. The timer 441b measures the time elapsed since it is started by the transmission rate comparison unit 441a, and provides the weight calculation unit 441c with the timer value. Until the timer 441b is started by the transmission rate comparison unit 441a, the timer 441b waits and conducts nothing on the weight calculation unit 441c.

The weight calculation unit 441c calculates a weight based on the transmission rate (hereafter referred to as "transmission rate weight") as a weight for weighting the priority. The weight calculation unit 441c provides the weighting processing unit 441d with the calculated transmission rate weight. The weight calculation unit 441c substitutes a timer value "$\tau$" acquired from the timer 441b for a transmission rate weight function "$W(\tau)$" in which the transmission rate weight changes according to the timer value "$\tau$", and calculates the transmission rate weight. While the timer value is not provided by the timer 441b, the weight calculation unit 441c does not calculate the transmission rate weight.

Figure 8B:
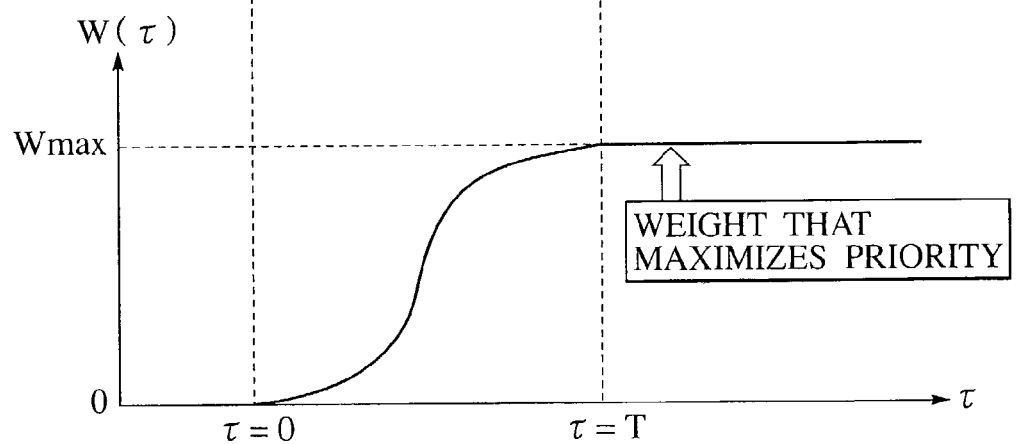

FIG. 8B is a graph showing a relation between the transmission rate weight function "$W(\tau)$" and the timer value "$\tau$". In FIG. 8B, the ordinate represents the transmission rate weight function "$W(\tau)$", and the abscissa represents the timer value "$\tau$". When the timer value $\tau=T$, it is possible to prevent the transmission rate "Ri(t)" from being made less than the assured transmission rate "Rmin" by conducting packet transmission once as shown in FIG. 8A. If packet transmission is not conducted, then the transmission rate "Ri(t)" becomes less than the assured transmission rate "Rmin" when the timer value "$\tau$" has exceeded "T". In other words, when the timer value $\tau=T$, the transmission rate "Ri(t)" can be maintained equal to at least the assured transmission rate "Rmin" after executing packet transmission once. When the transmission rate weight is Wmax shown in FIG. 8B, a channel is assigned to a packet to be transmitted to the mobile station 3 and the packet is transmitted without fail. As for the transmission rate weight function "W(τ)", such a function that the transmission rate weight Wmax is calculated by the time when the timer value τ=T is used.

For example, as shown in FIG. 8B, it is possible to use, as the transmission rate weight function "W(τ)", a function that gives, at the timer value "T", a transmission rate weight Wmax certainly maximizing the priority of the packet among packets waiting for channel assignment in the base station 2. The transmission rate weight function "W(τ)" shown in FIG. 8B can be represented by the following equation (2).

$$W(\tau)=W\max\ (\tau \leq T) \tag{2}$$

It is preferable to set, as the timer value τ=T, such time that the transmission rate "Ri(t)" is made equal to at least the prescribed transmission rate "Rg" by conducting transmission once.

The weighting processing unit 441d conducts weighting processing on the priority. The weighting processing unit 441d conducts weighting processing by performing addition or multiplication between the transmission rate weight provided from the weight calculation unit 441c and the priority. In the case where it is desired to make priority of a packet directed to a certain user higher than priorities of packets directed to other users, it is possible to conduct weighting processing by adding a transmission rate weight having a positive value to the priority of the packet directed to the user desired to be made higher in priority, multiplying the priority of the packet directed to the user desired to be made higher in priority by a transmission rate weight having a value greater than unity, adding a transmission rate weight having a negative value to the priorities of packets of other users, or multiplying the priorities of packets of other users by a transmission rate weight having a value less than unity. In the present embodiment, the weighting processing unit 441d adds a transmission rate weight Wmax to the priority of the packet so as to certainly maximize the priority of the packet among packets waiting for channel assignment in the base station 2.

The weighting processing unit 441d provides the priority comparison unit 45 with the weighted priority. When a weight is not provided by the weight calculation unit 441c, the weighting processing unit 441d does not conduct weighting processing and provides the priority comparison unit 45 with the priority as it is. When a weight is not provided by the weight calculation unit 441c, the weighting processing unit 441d may conduct weighting that does not change the priority, such as addition of "0" as the transmission rate weight or multiplication of "1" as the transmission rate weight, and may provide the priority comparison unit 45 with the weighted priority.

According to the weighting processing unit 441, it is possible to conduct weighting on the priority according to the actual transmission rate and change the priority, and the control device 4 can conduct channel assignment with due regard to the actual transmission rate. Especially, only in the case where the actual transmission rate of a packet directed to a user of a certain mobile station 3 has become slow as compared with the prescribed transmission rate determined based on the QoS-assured transmission rate, the system-assured transmission rate, and the base station assured transmission rate, the weight processing unit 441 conducts weighting so as to make the priority of the packet to be transmitted to the mobile station 3 of the user higher than priorities of other packets, thus makes the priority of the packet high and causes a channel to be assigned to the packet. As a result, the base station 2 can maintain the QoS-assured transmission rate, the system-assured transmission rate, and the base station assured transmission rate, and assure the user of them.

In addition, the weight processing unit 441 compares the actual transmission rate of a packet directed to a user of a certain mobile station 3 with the prescribed transmission rate, and the weight processing unit 441 does not conduct weighting for making the priority of a packet to be transmitted to the mobile station 3 of the user high while the actual transmission rate is faster. Even if the priority of that packet is originally high, a packet made high in priority as a result and included in other highly urgent packets to be transmitted earlier, if any, is transmitted earlier. Therefore, the base station 2 can cause transmission of a packet that has a margin for the QoS-assured transmission rate or the system-assured transmission rate to become later, prevent a packet from being transmitted at a transmission rate that is excessive as compared with the assured transmission rate, and give priority to a packet to be transmitted earlier, such as another highly urgent packet.

The weight processing unit 441 may compare the actual rate of transmission of a packet to a user of a certain mobile station 3 with the prescribed transmission rate, and conduct weighting so as to cause the priority of the packet to be transmitted to the mobile station 3 of the user to become low while the actual transmission rate is fast. As a result, it is possible to give priority to a packet to be transmitted earlier, such as another highly urgent packet, more certainly.

Figure 7B:
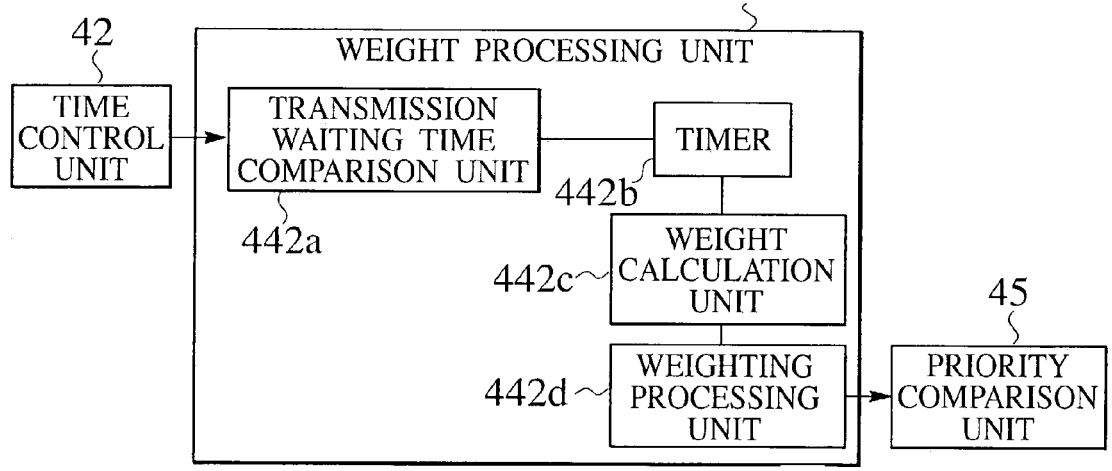

FIG. 7B shows a configuration of a weight processing unit 442 for conducting weighting on the priority based on the transmission waiting time. The weight processing unit 442 includes a transmission waiting time comparison unit 442a, a timer 442b, a weight calculation unit 442c, and a weighting processing unit 442d. The transmission waiting time comparison unit 442a compares the actual transmission waiting time with a prescribed value of the transmission waiting time determined beforehand (hereafter referred to as "prescribed transmission waiting time").

The prescribed transmission waiting time can be determined based on, for example, QoS information. From the viewpoint of suppression of the transmission waiting time required to satisfy the permissible delay time contained in the QoS information, it is possible to determine transmission waiting time assured of based on the QoS information (hereafter referred to as "QoS-assured transmission waiting time"), and determine the prescribed transmission waiting time based on the QoS-assured transmission waiting time. In the case where the communication system 1 assures users of the mobile stations 3 of transmission waiting time, or in the case where each base station assures the users of the mobile stations 3 of transmission waiting time, the prescribed transmission waiting time can be determined based on the transmission waiting time the communication system 1 assures users of the mobile stations 3 of (hereafter referred to as "system-assured transmission waiting time") or the transmission waiting time each base station assures the users of the mobile stations 3 of (hereafter referred to as "base station assured transmission waiting time"). Hereafter, the QoS-assured transmission waiting time, the system-assured transmission waiting time, and the base station assured transmission waiting time are collectively referred to as "assured transmission waiting time".

The prescribed transmission waiting time is transmission waiting time serving as a criterion in determining whether weighting for changing the priority should be conducted. Therefore, a value that is less than the assured transmission waiting time to some degree is set so as to be able to maintain the assured transmission waiting time. In the case where a prescribed transmission waiting time determined based on the QoS-assured transmission waiting time is used, the transmission waiting time comparison unit 442a acquires QoS information of the packet from the signal processing unit 41, and determines the prescribed transmission waiting time. In the case where a prescribed transmission waiting time determined based on the system-assured transmission waiting time is used, the transmission waiting time comparison unit 442a associates transmission destination user identification data with the prescribed transmission waiting time determined by using the system-assured transmission waiting time the user is assured of, and holds them. The transmission waiting time comparison unit 442a acquires the transmission destination user identification data from the signal processing unit 41 and acquires the prescribed transmission waiting time of the transmission destination user identification data. In the case where a prescribed transmission waiting time determined based on the base station assured transmission waiting time is used, the transmission waiting time comparison unit 442a holds the prescribed transmission waiting time.

The transmission waiting time comparison unit 442a acquires the actual transmission waiting time of a packet from the time control unit 42 from the time when the network interface unit 5 has acquired a packet. The transmission waiting time comparison unit 442a may acquire the transmission waiting time periodically, or acquire the transmission waiting time continuously. The transmission waiting time comparison unit 442a compares the actual transmission waiting time thus acquired with the prescribed transmission waiting time, and monitors a variation of the transmission waiting time. If the actual transmission waiting time exceeds the prescribed transmission waiting time, then the transmission waiting time comparison unit 442a starts the timer 442b. While the actual transmission waiting time is less than or equal to the prescribed transmission waiting time, the transmission waiting time comparison unit 442a conducts nothing on the timer 442b and continues to monitor the transmission waiting time.

Upon being started by the transmission waiting time comparison unit 442a, the timer 442b starts measurement of time. The timer 442b measures the time elapsed since it is started by the transmission waiting time comparison unit 442a, and provides the weight calculation unit 442c with the timer value. Until the timer 442b is started by the transmission waiting time comparison unit 442a, the timer 442b waits and conducts nothing on the weight calculation unit 442c.

The weight calculation unit 442c calculates a weight based on the transmission waiting time (hereafter referred to as "transmission waiting time weight") as a weight for weighting the priority. The weight calculation unit 442c provides the weighting processing unit 442d with the calculated transmission waiting time weight. The weight calculation unit 442c substitutes a timer value acquired from the timer 442b for a transmission waiting time weight function in which the transmission waiting time weight changes according to the timer value, and calculates the transmission waiting time weight. While the timer value is not provided by the timer 442b, the weight calculation unit 442c does not calculate the transmission waiting time weight.

At a timer value "T1", it is possible to prevent the transmission waiting time from exceeding the assured transmission waiting time by conducting packet transmission once. If packet transmission is not conducted, then the transmission waiting time exceeds the assured transmission waiting time when the timer value has exceeded "T1". In other words, at the timer value T1, the transmission waiting time can be maintained equal to the assured transmission waiting time or less after executing packet transmission once. At a transmission waiting time weight, a channel is assigned to a packet to be transmitted to the mobile station 3 and the packet is transmitted without fail. As for the transmission waiting time weight function, such a function that the transmission waiting time weight is calculated by arrival of the timer value "T1" is used. For example, it is possible to use, as the transmission waiting time weight function, a function that gives, at the timer value "T1", a transmission waiting time weight certainly maximizing the priority of the packet among packets waiting for channel assignment in the base station 2.

The weighting processing unit 442d conducts weighting processing by performing addition or multiplication between the transmission waiting time weight provided from the weight calculation unit 442c and the priority. In the case where it is desired to make priority of a packet directed to a certain user higher than priorities of packets directed to other users, it is possible to conduct weighting processing by adding a transmission waiting time weight having a positive value to the priority of the packet directed to the user desired to be made higher in priority, multiplying the priority of the packet directed to the user desired to be made higher in priority by a transmission waiting time weight having a value greater than unity, adding a transmission waiting time weight having a negative value to the priorities of packets of other users, or multiplying the priorities of packets of other users by a transmission waiting time weight having a value less than unity.

The weighting processing unit 442d provides the priority comparison unit 45 with the weighted priority. When a weight is not provided by the weight calculation unit 442c, the weighting processing unit 442d does not conduct weighting processing and provides the priority comparison unit 45 with the priority as it is. When a weight is not provided by the weight calculation unit 442c, the weighting processing unit 442d may conduct weighting that does not change the priority, and provide the priority comparison unit 45 with the weighted priority.

According to the weighting processing unit 442, it is possible to conduct weighting on the priority according to the actual transmission waiting time and change the priority, and the control device 4 can conduct channel assignment with due regard to the actual transmission waiting time. Especially, only in the case where the actual transmission waiting time of a packet directed to a user of a certain mobile station 3 has become great as compared with the prescribed transmission waiting time determined based on the QoS-assured transmission waiting time, the system-assured transmission waiting time, and the base station assured transmission waiting time, the weight processing unit 442 conducts weighting so as to make the priority of the packet to be transmitted to the mobile station 3 of the user higher than priorities of other packets, thus makes the priority of the packet high and causes a channel to be assigned to the packet. As a result, the base station 2 can maintain the QoS-assured transmission waiting time, the system-assured transmission waiting time, and the base station assured transmission waiting time, assure the user of them, and maintain the fairness between mobile stations.

In addition, the weight processing unit 442 compares the actual transmission waiting time of a packet directed to a user of a certain mobile station 3 with the prescribed transmission waiting time, and the weight processing unit 442 does not conduct weighting for making the priority of a packet to be transmitted to the mobile station 3 of the user high while the actual transmission waiting time is short. Even if the priority of that packet is originally high, a packet made high in priority as a result and included in other highly urgent packets to be transmitted earlier, if any, is transmitted earlier. Therefore, the base station 2 can cause transmission of a packet that has a margin for the QoS-assured transmission waiting time or the system-assured transmission waiting time to become later, prevent a packet from being transmitted at a transmission waiting time that is excessive as compared with the assured transmission waiting time, and give priority to a packet to be transmitted earlier, such as another highly urgent packet. The weight processing unit 442 may compare the actual waiting time of transmission of a packet directed to a user of a certain mobile station 3 with the prescribed transmission waiting time, and conduct weighting so as to cause the priority of the packet to be transmitted to the mobile station 3 of the user to become low while the actual transmission waiting time is short. As a result, it is possible to give priority to a packet to be transmitted earlier, such as another highly urgent packet, more certainly.

Figure 7C:
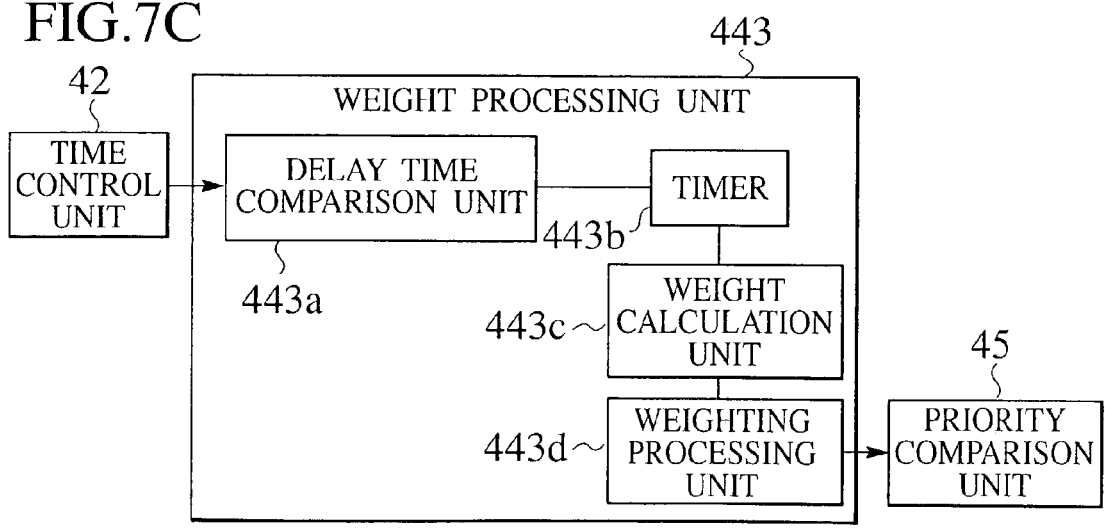

FIG. 7C is a block diagram showing a weight processing unit 443 for conducting weighting on the priority based on the delay time. The weight processing unit 443 includes a delay time comparison unit 443a, a timer 443b, a weight calculation unit 443c, and a weighting processing unit 443d. The delay time comparison unit 443a compares the actual delay time with a prescribed value of the delay time determined beforehand (hereafter referred to as "prescribed delay time"). The prescribed delay time can be determined based on, for example, permissible delay time contained in QoS information. The prescribed delay time is delay time serving as a criterion in determining whether weighting for changing the priority should be conducted. Therefore, a value that is less than the permissible delay time to some degree is set so as to satisfy the permissible delay time.

The delay time comparison unit 443a acquires QoS information of the packet from the signal processing unit 41, and determines the prescribed delay time. The delay time comparison unit 443a acquires the actual delay time of a packet from the time control unit 42 from the time when the network interface unit 5 has acquired a packet. The delay time comparison unit 443a may acquire the delay time periodically, or acquire the delay time continuously. The delay time comparison unit 443a compares the actual delay time thus acquired with the prescribed delay time, and monitors a variation of the delay time. If the actual delay time exceeds the prescribed delay time, then the delay time comparison unit 443a starts the timer 443b. While the actual delay time is less than or equal to the prescribed delay time, the delay time comparison unit 443a conducts nothing on the timer 443b and continues to monitor the delay time.

Upon being started by the delay time comparison unit 443a, the timer 443b starts measurement of time. The timer 443b measures the time elapsed since it is started by the delay time comparison unit 443a, and provides the weight calculation unit 443c with the timer value. Until the timer 443b is started by the delay time comparison unit 443a, the timer 443b waits and conducts nothing on the weight calculation unit 443c.

The weight calculation unit 443c calculates a weight based on the delay time (hereafter referred to as "delay time weight") as a weight for weighting the priority. The weight calculation unit 443c provides the weighting processing unit 443d with the calculated delay time weight. The weight calculation unit 443c substitutes a timer value acquired from the timer 443b for a delay time weight function in which the delay time weight changes according to the timer value, and calculates the delay time weight. While the timer value is not provided by the timer 443b, the weight calculation unit 443c does not calculate the delay time weight.

At a timer value "T2", it is possible to prevent the delay time from exceeding the permissible delay time by conducting packet transmission once. If packet transmission is not conducted, then the delay time exceeds the permissible delay time when the timer value has exceeded "T2". In other words, at the timer value T2, the delay time can be maintained equal to the permissible delay time or less after executing packet transmission once. At a delay time weight, a channel is assigned to a packet to be transmitted to the mobile station 3 and the packet is transmitted without fail. As for the delay time weight function, such a function that the delay time weight is calculated by arrival of the timer value "T2" is used. For example, it is possible to use, as the delay time weight function, a function that gives, at the timer value "T2", a delay time weight certainly maximizing the priority of the packet among packets waiting for channel assignment in the base station 2.

The weighting processing unit 443d conducts weighting processing by performing addition or multiplication between the delay time weight provided from the weight calculation unit 443c and the priority. In the case where it is desired to make priority of a packet directed to a certain user higher than priorities of packets directed to other users, it is possible to conduct weighting processing by adding a delay time weight having a positive value to the priority of the packet directed to the user desired to be made higher in priority, multiplying the priority of the packet directed to the user desired to be made higher in priority by a delay time weight having a value greater than unity, adding a delay time weight having a negative value to the priorities of packets of other users, or multiplying the priorities of packets of other users by a delay time weight having a value less than unity.

The weighting processing unit 443d provides the priority comparison unit 45 with the weighted priority. When a weight is not provided by the weight calculation unit 443c, the weighting processing unit 443d does not conduct weighting processing and provides the priority comparison unit 45 with the priority as it is. When a weight is not provided by the weight calculation unit 443c, the weighting processing unit 443d may conduct weighting that does not change the priority, and provide the priority comparison unit 45 with the weighted priority.

According to the weighting processing unit 443, it is possible to conduct weighting on the priority according to the actual delay time and change the priority, and the control device 4 can conduct channel assignment with due regard to the actual delay time. Especially, only in the case where the actual delay time of a packet directed to a user of a certain mobile station 3 has become great as compared with the prescribed delay time determined based on the permissible delay time, the weight processing unit 443 conducts weighting so as to make the priority of the packet to be transmitted to the mobile station 3 of the user higher than priorities of other packets, thus makes the priority of the packet high and causes a channel to be assigned to the packet. As a result, the base station 2 can assure the permissible delay time.

In addition, the weight processing unit 443 compares the actual delay time of a packet directed to a user of a certain mobile station 3 with the prescribed delay time, and the weight processing unit 443 does not conduct weighting for making the priority of a packet to be transmitted to the mobile station 3 of the user high while the actual delay time is short. Even if the priority of that packet is originally high, a packet made high in priority as a result and included in other highly urgent packets to be transmitted earlier, if any, is transmitted earlier. Therefore, the base station 2 can cause transmission of a packet that has a margin for the permissible delay time to become later, prevent a packet from being transmitted at a quality that is excessive as compared with the permissible delay time, and give priority to a packet to be transmitted earlier, such as another highly urgent packet.

The weight processing unit 443 may compare the actual delay time of a packet directed to a user of a certain mobil station 3 with the prescribed delay time, and conduct weighting so as to cause the priority of the packet to be transmitted to the mobile station 3 of the user to become low while the actual delay time is short. As a result, it is possible to give priority to a packet to be transmitted earlier, such as another highly urgent packet, more certainly and prevent a packet from being transmitted with a quality that is excessive as compared with the permissible delay time.

A weight processing unit 44 may calculate a synthetic weight based on a plurality of kinds of information (hereafter referred to as "synthetic weight") as the weight, and conduct weighting. FIG. 7D shows a weight processing unit 444 for conducting weighting on priority by synthetically considering the transmission rate, the transmission waiting time, and the delay time. The weight processing unit 444 includes a transmission rate comparison unit 444a, a transmission waiting time comparison unit 444c, a delay time comparison unit 444e, timers 444b, 444d and 444f, a weight calculation unit 444g, and a weighting processing unit 444l. The weight calculation unit 444g includes a transmission rate weight calculation unit 444h, a transmission waiting time weight calculation unit 444i, a delay time weight calculation unit 444j, and a weight unification unit 444k.

The transmission rate comparison unit 444a, the timer 444b and the transmission rate weight calculation unit 444h are substantially the same as the transmission rate comparison unit 441a, the timer 441b and the weight calculation unit 441c shown in FIG. 7A, respectively. The transmission waiting time comparison unit 444c, the timer 444d and the transmission waiting time weight calculation unit 444i are substantially the same as the transmission waiting time comparison unit 442a, the timer 442b and the weight calculation unit 442c shown in FIG. 7B, respectively. The delay time comparison unit 444e, the timer 444f and the delay time weight calculation unit 444j are substantially the same as the delay time comparison unit 443a, the timer 443b and the weight calculation unit 443c shown in FIG. 7C, respectively.

The transmission rate weight calculation unit 444h provides the weight unification unit 444k with the calculated transmission rate weight. The transmission waiting time weight calculation unit 444i provides the weight unification unit 444k with the calculated transmission waiting time weight. The delay time weight calculation unit 444j provides the weight unification unit 444k with the calculated delay time weight. In the weight calculation unit 444g, the transmission rate weight calculation unit 444h, the transmission waiting time weight calculation unit 444i, and the delay time weight calculation unit 444j are individual weight calculation units for calculating individual weights based on respective kinds of information (hereafter referred to as "individual weights").

The weight unification unit 444k unifies a plurality of individual weights calculated by a plurality of individual weight calculation units and determines a synthetic weight. The weight unification unit 444k unifies the transmission rate weight, the transmission waiting time weight, and the delay time weight, which are individual weights respectively calculated based on the transmission rate, the transmission waiting time, and the delay time by the transmission rate weight calculation unit 444h, the transmission waiting time weight calculation unit 444i, and the delay time weight calculation unit 444j. The weight unification unit 444k thus determines the synthetic weight.

The weight unification unit 444k can determine the synthetic weight by, for example, adding the individual weights, i.e., the transmission rate weights, the transmission waiting time weights, and delay time weights respectively multiplied by coefficients. Each base station 2 may set the coefficients as fixed values, or may determine the coefficients according to the situation and change the coefficients adaptively according to the situation. The weight unification unit 444k can freely change a condition of calculating the synthetic weight by changing setting of fixed values of the respective coefficients or determining the respective coefficients according to the situation. Especially, the weight unification unit 444k can increase a coefficient of an individual weight calculated based on information desired to be thought much of, and easily calculate a synthetic weight with the information thought much of. The weight unification unit 444k can set a coefficient of an individual weight judged to be unnecessary to consider equal to 0.

If any of the transmission rate weight, the transmission waiting time weight, and the delay time weight respectively from the transmission rate weight calculation unit 444h, the transmission waiting time weight calculation unit 444i, and the delay time weight calculation unit 444j is not provided, then the weight unification unit 444k determines the synthetic weight by using only the provided weights without considering the weight that has not been provided. If none of the transmission rate weight, the transmission waiting time weight, and the delay time weight is not provided, then the weight unification unit 444k does not conduct determination of the synthetic weight. The weight unification unit 444k provides the weighting processing unit 444l with the determined synthetic weight.

The weighting processing unit 444l conducts weighting processing by performing addition or multiplication between the synthetic weight provided from the weight unification unit 444k and the priority. If a synthetic weight is not provided by the weight unification unit 444k, then the weighting processing unit 444l does not conduct weighting processing and provides the priority comparison unit 45 with the priority as it is. If a weight is not provided by the weight unification unit 444k, then the weighting processing unit 444l may conduct weighting that does not change the priority, and provide the priority comparison unit 45 with the weighted priority.

According to the weight calculation unit 444g, the weight processing unit 444 can calculate a weight with due regard to a plurality of kinds of information, and change the priority while considering the plurality of kinds of information. As a result, the base station 2 can implement simultaneously maintenance of the assured transmission rate, maintenance of the assured transmission waiting time, and response to a request of the permissible delay time. Furthermore, the base station 2 can prevent a packet from being transmitted with a quality that is excessive as compared with the assured transmission rate, the assured transmission waiting time, and delay time, and give priority to a packet to be transmitted earlier, such as another highly urgent packet.

Figure 9:
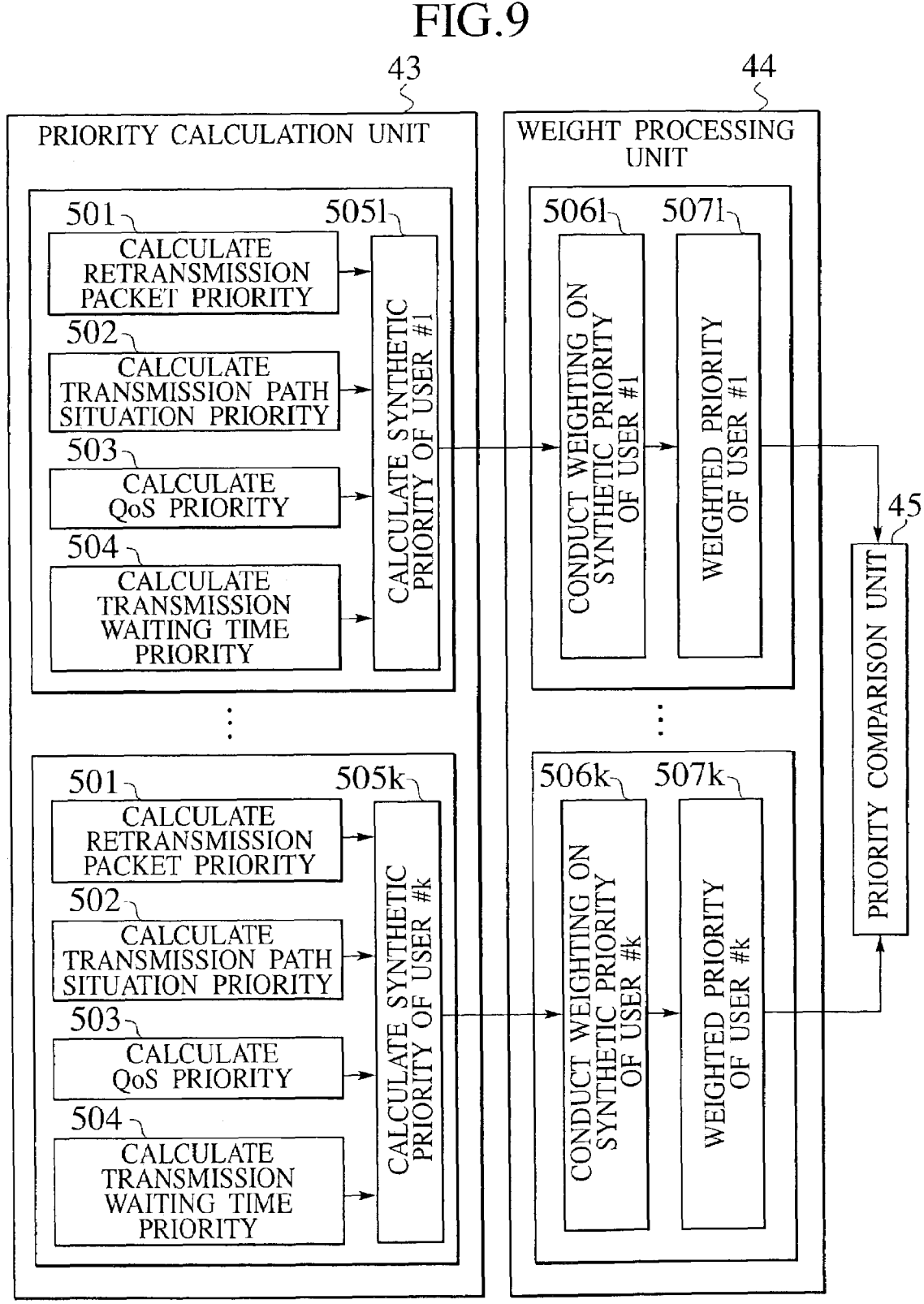
FIG. 9 is a diagram showing a priority calculation unit and a weight processing unit according to a first embodiment of the present invention.

FIG. 9 is a diagram showing the priority calculation unit 43 and the weight processing unit 44. With respect to a packet directed to each of the users #1 to #k of the mobile stations, the retransmission packet priority calculation unit 431 calculates the retransmission packet priority (501), and the transmission path situation priority calculation unit 432 calculates the transmission path situation priority (502). The QoS priority calculation unit 433 calculates the QoS priority (503)

and the transmission waiting time priority calculation unit 434 calculates the transmission waiting time priority (504). The calculated priorities are provided for the priority unification unit 435. The priority unification unit 435 unifies the acquired retransmission packet priority, transmission path situation priority, QoS priority and transmission waiting time priority of packets directed to the users #1 to #k of the mobile stations 3 every user, and calculates the synthetic priority of each of packets directed to the users #1 to #k (505*l*,505*k*). The priority unification unit 435 provides the weight processing unit 44 with the synthetic priority. The weight processing unit 44 conducts weighting on the synthetic priority of a packet directed to each of the users #1 to #k (506*l*,506*k*). Finally, the weight processing unit 44 provides the priority comparison unit 45 with the weighted priority of the packet directed to each of the users #1 to #k (507*l*, 507*k*).

The priority comparison unit 45 compares priorities of packets weighted by the weight processing unit 44 with each other, and judges a packet to be transmitted. The priority comparison unit 45 compares priorities of packets with each other, and fixes upon a weighted packet having high priority as the packet to be transmitted. On the other hand, the priority comparison unit 45 fixes upon weighted packets having low priority as the packets to be untransmitted this time.

The priority comparison unit 45 provides the transmission decision unit 46 with packet identification data of the packet determined to be transmitted, and notifies the transmission decision unit 46 of the packet determined to be transmitted. On the other hand, the priority comparison unit 45 provides the signal processing unit 41 with packet identification data of the packets determined to be left over in transmission, conducts the priority calculation and its weighting again, and notifies the signal processing unit 41 of a packet to be assigned a channel.

The priority comparison unit 45 notifies the time control unit 42 of the result of priority comparison. The priority comparison unit 45 notifies the time control unit 42 of leaving over the transmission in association with packet identification data of packets determined to be left over in transmission. The packets determined to be untransmitted this time enter a queue. Therefore, the time control unit 42 continues the measurement of the transmission waiting time on the packets a notice of leaving over transmission of which has been given to the time control unit 42 by the priority comparison unit 45. As a result, the transmission waiting time of the packets are gradually updated.

The transmission decision unit 46 determines whether transmission of the packet determined to be transmitted by the priority comparison unit 45 is possible, based on the reception state of the mobile station 3 that is the transmission destination of the packet. If the reception state of the mobile station 3 of the transmission destination is good, then the transmission decision unit 46 judges transmission of the packet to be possible. And the transmission decision unit 46 assigns a channel for transmitting the packet to the packet. The transmission decision unit 46 notifies the radio unit 8 of a result of the channel assignment. The radio unit 8 transmits the packet to the mobile station 3 according to the channel assignment notified of by the transmission decision unit 46.

The channel assignment differs according to the access scheme. The transmission decision unit 46 assigns a time slot in the TDMA (Time Division Multiple Access), a spreading code in the CDMA (Code Division Multiple Access), and a frequency in the FDMA (Frequency Division Multiple Access), as the channel.

The transmission decision unit 46 determines whether each packet can be transmitted, and assigns a channel to each packet. Furthermore, it is preferable that the transmission decision unit 46 determines fast whether transmission of a packet is possible, immediately before actual transmission of the packet to a mobile station 3, and conducts channel assignment from instant to instant. On the other hand, if the reception state of the mobile station 3 of transmission destination is not good, then the transmission decision unit 46 judges the transmission to be impossible. And the transmission decision unit 46 provides the signal processing unit 41 with packet identification data of the packet judged to be impossible in transmission, and notifies the signal processing unit 41 of the packet as a packet to be conducted priority calculation, its weighting, and assigned a channel again.

Furthermore, the transmission decision unit 46 notifies the time control unit 42 of a result of the transmission decision. The transmission decision unit 46 notifies the time control unit 42 of a decision result as to transmission is possible, so as to be associated with packet identification data of the packet. The packets judged to be impossible in transmission enter a queue. Therefore, the time control unit 42 continues the measurement of transmission waiting time on the packets the transmission decision unit 46 has notified that transmission of which is impossible. As a result, the transmission waiting time of the packets are gradually updated. On the other hand, as for the packet judged to be possible in transmission, it is not necessary to update the transmission waiting time, and consequently the time control unit 42 finishes the measurement of the transmission waiting time.

Furthermore, the transmission decision unit 46 leaves off the transmission of packets judged to be impossible in transmission. Therefore, the transmission decision unit 46 acquires packet identification data of another packet determined to be transmitted by the priority comparison unit 45, and determines whether the packet can be transmitted. If the transmission decision unit 46 has judged the packet to be possible in transmission, then the transmission decision unit 46 assigns a channel to the packet. In this way, the priority comparison unit 45 and the transmission decision unit 46 implement a channel control unit that assigns a channel for transmission of the packet to a mobile station 3, to the packet based on the priority of the packet weighted by the weight processing unit 44 and the reception state of the mobile station 3.

To be concrete, the transmission decision unit 46 judges the reception state of the mobile station 3 based on the situation of the transmission path formed between the mobile station 3 and the base station 2. For example, the transmission decision unit 46 obtains an estimate value of a success probability, which indicates a possibility that the transmission of the packet will succeed in the transmission path situation, as the reception state of the mobile station 3 based on the transmission path situation. And the transmission decision unit 46 can determine whether the transmission is possible, based on the estimate value of the success probability.

Figure 10:
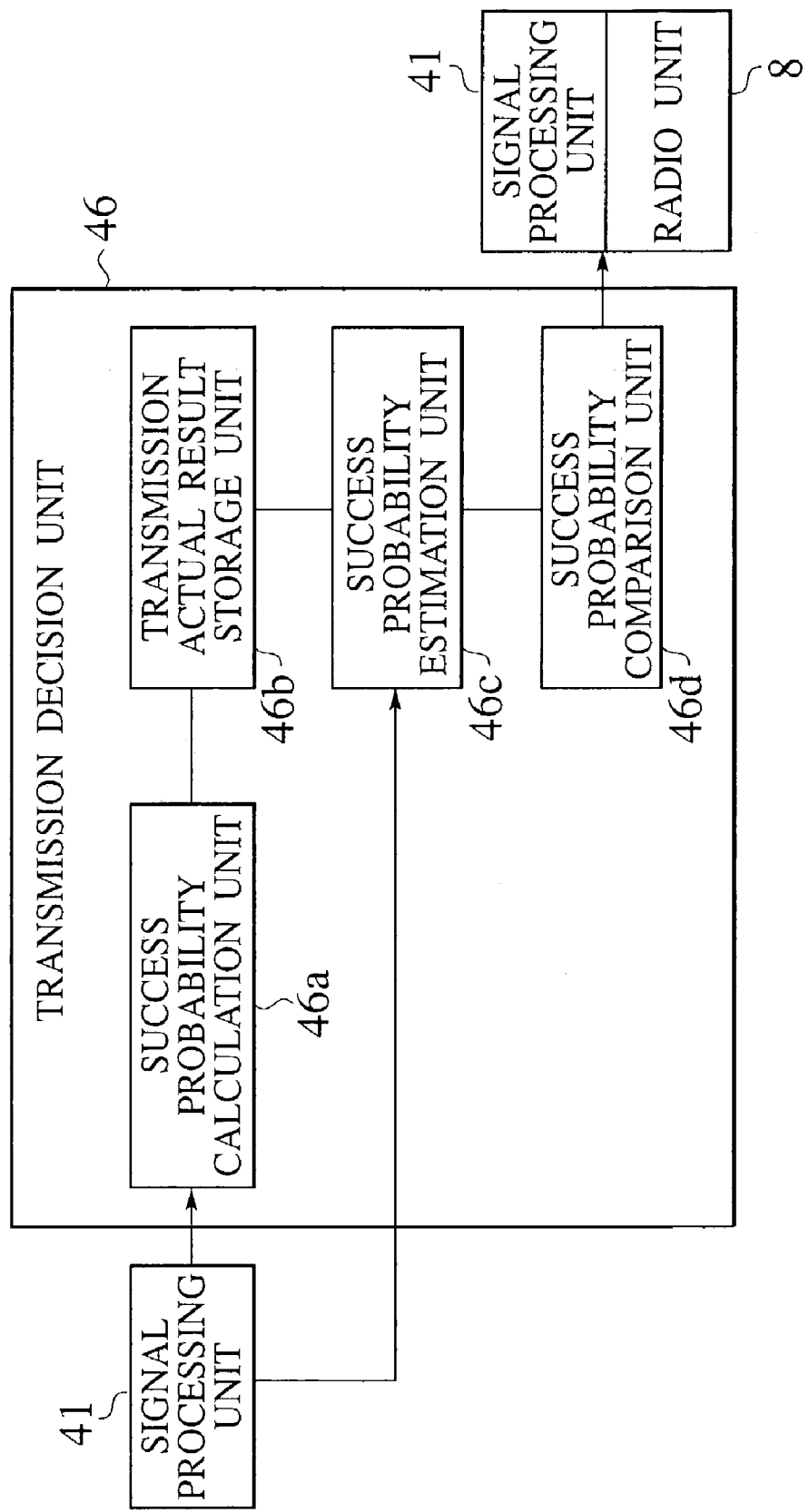
FIG. 10 is a block diagram showing a configuration of a transmission decision unit according to a first embodiment of the present invention.

FIG. 10 is a block diagram showing a configuration of the transmission decision unit 46. The transmission decision unit 46 includes a success probability calculation unit 46*a*, a transmission actual result storage unit 46*b*, a success probability estimation unit 46*c*, and a success probability comparison unit 46*d*. The success probability calculation unit 46*a* calculates the probability that the transmission of the packet has succeeded in the transmission path situation at the time when the packet is transmitted, i.e., an actual result value of the success probability in the transmission path situation. The success probability calculation unit 46*a* acquires transmission path information concerning the transmission path situation at the time when the packet is transmitted and ACK/

NACK information of the packet from the signal processing unit 41. The success probability calculation unit 46a acquires, for example, SIR as the transmission path information. And the success probability calculation unit 46a calculates an actual result value in each SIR based on the ACK/NACK information.

The transmission actual result storage unit 46b stores the transmission path situation at the time when the packet has been transmitted and the actual result value of the success probability so as to associate them with each other. The success probability calculation unit 46a stores the calculated actual result value of the success probability in the transmission actual result storage unit 46b so as to be associated with the transmission path situation. The transmission actual result storage unit 46b stores, for example, the SIR and the actual result value of the success probability in the SIR so as to associate them with each other.

The success probability estimation unit 46c acquires the actual result value of the success probability from the transmission actual result storage unit 46b and obtains the estimate value of the success probability. To be concrete, the success probability estimation unit 46c acquires the transmission path information from the signal processing unit 41 when making a transmission decision. The success probability estimation unit 46c acquires the actual result value of the success probability corresponding to the transmission path situation based on the acquired transmission path situation. The success probability estimation unit 46c obtains an estimate value of a success probability indicating a possibility that the transmission will succeed in the current transmission path situation, based on the acquired actual result value of the success probability. The success probability estimation unit 46c provides the success probability comparison unit 46d with the estimate value of the success probability.

The success probability comparison unit 46d compares the estimate value of the success probability with a preset reference value of the success probability, and determines whether transmission is possible. If the estimate value of the success probability is less than the reference value of the success probability, then the success probability comparison unit 46d judges the transmission to be impossible. If the estimate value of the success probability is at least the reference value of the success probability, then the success probability comparison unit 46d judges the transmission to be possible. If the transmission is judged to be impossible, then the success probability comparison unit 46d notifies the signal processing unit 41 of packet identification data of the packet. If the transmission is judged to be possible, then the success probability comparison unit 46d assigns a channel to the packet, and notifies the radio unit 8 of the channel.

As the reference value of the success probability becomes higher, it is possible to suppress transmission having a possibility of failure and prevent a waste of radio resources. If the reference value of the success probability is too high, however, packets judged to be impossible in transmission increase, and the number of times of processing of the priority calculation and comparison and the transmission decision conducted by the control device 4 increases, resulting in a lowered processing efficiency of resource assignment. Therefore, it is preferable to set the reference value of the success probability by considering the waste prevention of radio resources and the processing efficiency of the channel assignment. The success probability comparison unit 46d holds the preset reference value of the success probability.

(Communication Method)

Figure 11:
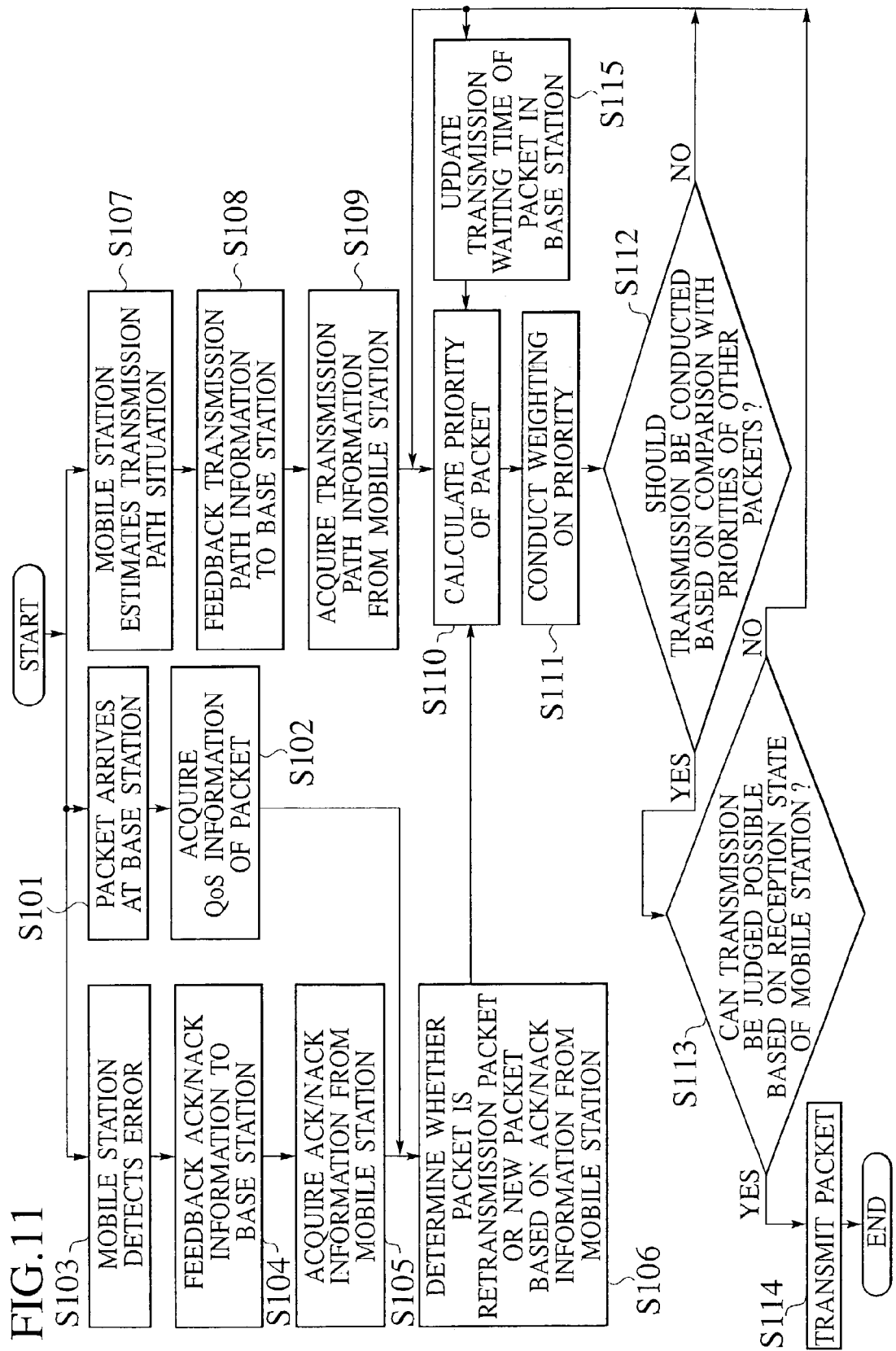
FIG. 11 is a flow diagram showing a procedure of a communication method according to a first embodiment of the present invention.

A communication method executed by using the communication system 1 will now be described. As shown in FIG. 11, first, a packet from a terminal device arrives at the base station 2 via the network 10, and the network interface unit 5 acquires the packet (S101). The network interface unit 5 temporarily stores the acquired packet in the transmission buffer 6. The baseband processing unit 7 takes out the packet from the transmission buffer 6, and provides the signal processing unit 41 with the control information part of the packet. The signal processing unit 41 acquires QoS information and packet identification data from the control information part of the packet (S102). A mobile station 3 conducts detection to determine whether there is an error in the received packet (S103). The mobile station 3 transmits a result of the detection to the base station 2 on an up control channel as a control signal containing ACK/NACK information to effect feedback (S104).

The radio unit 8 receives the control signal from the mobile station 3, and the signal processing unit 41 acquires the control signal from the baseband processing unit 7, and acquires the ACK/NACK information (S105). The retransmission packet priority calculation unit 431 determines whether the packet, QoS information of which has been acquired by the signal processing unit 41 at the step (S102), is a retransmission packet or a new packet, based on the packet identification data and the ACK/NACK information (S106). The mobile station 3 estimates the transmission path situation (S107). The mobile station 3 transmits the estimated transmission path situation to the base station 2 on an up control channel as a control signal containing transmission path information to effect feedback (S108). The radio unit 8 receives the control signal from the mobile station 3, and the signal processing unit 41 acquires the control signal from the baseband processing unit 7 and acquires the transmission path information (S109).

The priority calculation unit 43 calculates the synthetic priority of the packet based on the QoS information, the new/retransmission packet information, and the transmission path information (S110). The weight processing unit 44 conducts weighting on the synthetic priority calculated by the priority calculation unit 43 (S111). The priority comparison unit 45 compares weighted priority of a certain packet with weighted priorities of other packets, and determines whether the packet should be transmitted (S112). If the weighted priority of the packet is higher than priorities of other packets at the step (S112), then the priority comparison unit 45 judges that the packet should be transmitted. And the transmission decision unit 46 determines whether transmission is possible, based on the reception state of the mobile station 3 that is the transmission destination of the packet (S113). If the transmission is judged to be possible at the step (S113), then the transmission decision unit 46 assigns a channel to the packet, and the radio unit 8 transmits the packet to the mobile station 3 (S114).

On the other hand, if the weighted priority of the packet is lower than priorities of other packets at the step (S112), then the priority comparison unit 45 judges that the transmission of the packet should be left over. And the packet enters a queue. The priority comparison unit 45 notifies the time control unit 42 that the transmission of the packet is left over. And the time control unit 42 continues measurement of the transmission waiting time of the packet, and updates the transmission waiting time (S115). The priority comparison unit 45 notifies the signal processing unit 41 that the transmission of the packet is left over. The packet judged to be left over in transmission is subject to the priority calculation, priority weighting, comparison of weighted priorities, and transmission decision again. In the priority calculation and weighting, the transmission waiting time is also considered.

If the transmission of the packet is judged to be impossible at the step (S113), then the packet enters a queue. The transmission decision unit 46 notifies the time control unit 42 of the decision result indicating that the transmission is impossible. And the time control unit 42 continues the measurement of the transmission waiting time, and updates the transmission waiting time (S115). The transmission decision unit 46 notifies the signal processing unit 41 of the decision result indicating that the transmission is impossible. The packet judged to be impossible in transmission is subject to the priority calculation, priority weighting, comparison of weighted priorities, and transmission decision again. In the priority calculation and weighting, the transmission waiting time is also considered.

According to the communication system 1, the base station 2, the control device 4 and the communication method, the network interface unit 5 acquires a packet transmitted from a terminal device to a certain mobile station 3, from the terminal device. Subsequently, the priority calculation unit 43 calculates priority of transmission of the packet acquired by the network interface unit 5 to the mobile station 3. The weight processing unit 44 conducts weighting on the calculated priority. The priority comparison unit 45 compares weighted priorities with each other, and determines a packet to be transmitted. The transmission decision unit 46 determines whether the packet can be transmitted based on the reception state of the mobile station 3 that is the transmission destination, and assigns a channel to the packet judged to be possible in transmission. And the radio unit 8 transmits the packet to the mobile station 3 on the assigned channel.

Therefore, the weight processing unit 44 conducts weighting on the priority calculated once by the priority calculation unit 43, and the priority comparison unit 45 determines a packet to be transmitted, based on the weighted priority. And the transmission decision unit 46 can determine whether the packet determined to be transmitted can be transmitted and conduct channel assignment. Without being necessarily restricted by priority calculated once, therefore, the base station 2 and the control device 4 can assign a channel as occasion may demand according to the situation obtained when transmitting a packet.

Furthermore, the priority calculation unit 43 calculates the synthetic priority by using a plurality of kinds of information as priority. The priority calculation unit 43 includes the retransmission packet priority calculation unit 431, the transmission path situation priority calculation unit 432, the QoS priority calculation unit 433, the transmission waiting time priority calculation unit 434, and the priority unification unit 435. The priority unification unit 435 unifies a plurality of individual priorities calculated by these individual priority calculation units, i.e., the retransmission packet priority, the transmission path situation priority, the QoS priority, and the transmission waiting time priority, and determines the synthetic priority.

As a result, the priority calculation unit 43 can calculate priority with due regard to a plurality of kinds of information, and the priority comparison unit 45 can determine a packet to be transmitted, based on priority calculated considering a plurality of kinds of information. And the transmission decision unit 46 can determine whether the packet determined to be transmitted by the priority comparison unit 45 can be transmitted and assign a channel. By using a combination of kinds of information in use, therefore, it is possible to simultaneously implement highly efficient packet transmission, reception quality improvement, maintenance of opportunity fairness in communication among the mobile stations 3, and coping with the service quality, such as the delay time, requested in transmission of data contained in the packet.

Furthermore, the transmission decision unit 46 determines whether transmission of the packet is possible, based on the reception state of the mobile station 3, and conducts channel assignment. As a result, the control device 4 can conduct channel assignment while considering the reception state of the mobile station 3. When the reception state of the mobile station 3 that is the transmission destination is good, therefore, the transmission decision unit 46 can assign a channel to a packet directed to the mobile station 3 and give an opportunity of transmission of the packet, to the radio station 8. Therefore, the base station 2 can prevent from assigning a channel uselessly to a packet for the reason that the packet has high priority and wasting radio resources. In other words, even if a packet has high priority, the base station 2 can prevent from assigning an opportunity of transmission of the packet to the radio unit 8 when the possibility that the transmission of the packet will fail is high, and from wasting the radio resources.

Second Embodiment (Communication System)

Figure 12:
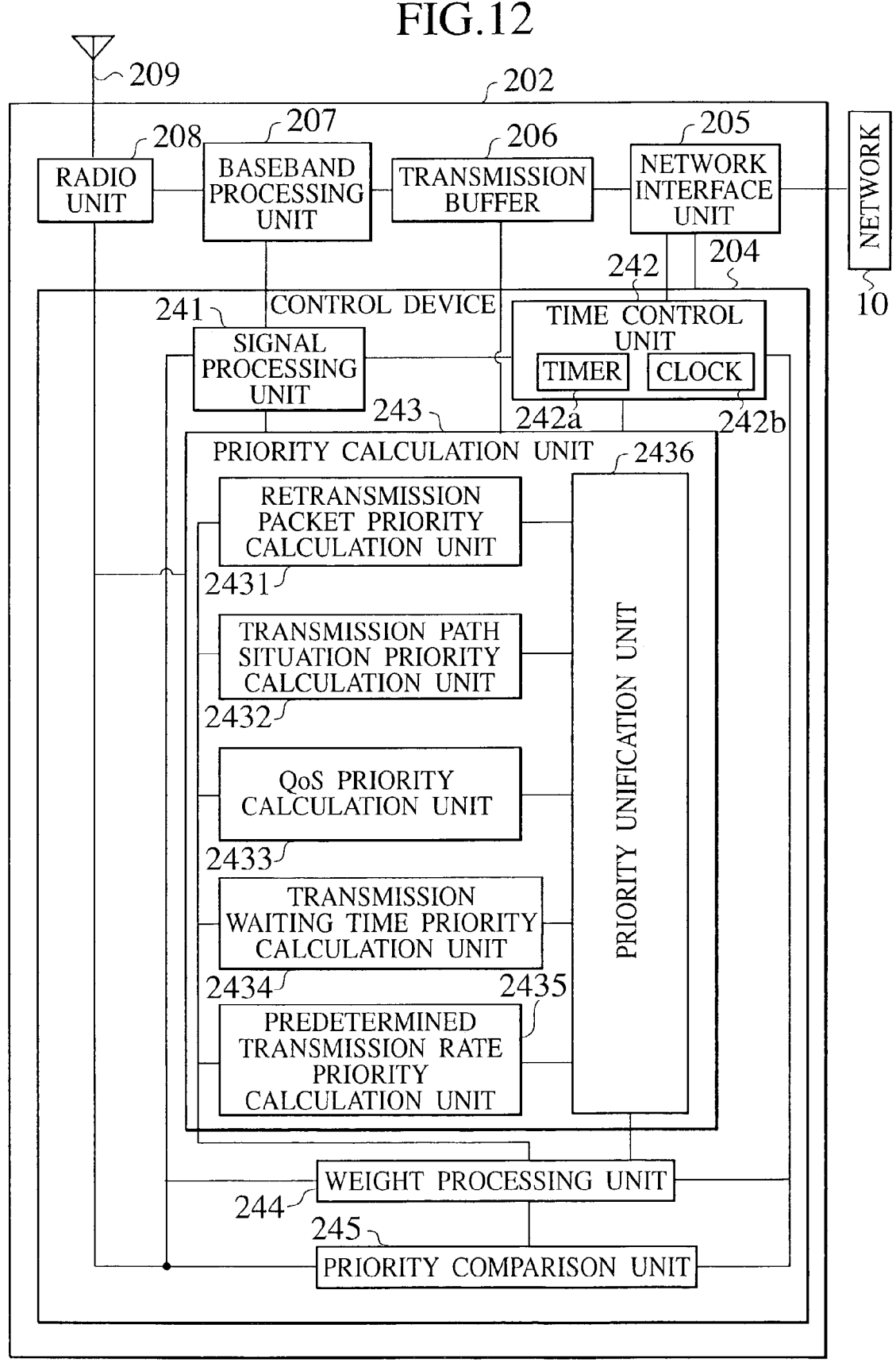
FIG. 12 is a block diagram showing a configuration of a base station according to a second embodiment of the present invention.

A second embodiment of the present invention will now be described with reference to the drawings. A communication system according to the second embodiment includes a base station 202 shown in FIG. 12 and a plurality of mobile stations 3. The base station 202 includes a control device 204, a network interface unit 205, a transmission buffer 206, a baseband processing unit 207, a radio unit 208, and an antenna 209. The control device 204 includes a signal processing unit 241, a time control unit 242, a priority calculation unit 243, a weight processing unit 244, and a priority comparison unit 245. The time control unit 242 includes a timer 242a and a clock 242b. The network interface unit 205, the transmission buffer 206, the baseband processing unit 207, the radio unit 208, the antenna 209, the signal processing unit 241, and the time control unit 242 are substantially the same as the network interface unit 5, the transmission buffer 6, the baseband processing unit 7, the radio unit 8, the antenna 9, the signal processing unit 41, and the time control unit 42 shown in FIG. 2, respectively.

The priority calculation unit 243 includes a retransmission packet priority calculation unit 2431, a transmission path situation priority calculation unit 2432, a QoS priority calculation unit 2433, a transmission waiting time priority calculation unit 2434, a predetermined transmission rate priority calculation unit 2435, and a priority unification unit 2436. The retransmission packet priority calculation unit 2431, the transmission path situation priority calculation unit 2432, the QoS priority calculation unit 2433, and the transmission waiting time priority calculation unit 2434 are substantially the same as the retransmission packet priority calculation unit 431, the transmission path situation priority calculation unit 432, the QoS priority calculation unit 433, and the transmission waiting time priority calculation unit 434 shown in FIG. 2, respectively.

The predetermined transmission rate priority calculation unit 2435 calculates priority based on a predetermined transmission rate determined as a transmission rate of packet transmission from the radio unit 8 to the mobile station 3. The priority calculated based on the predetermined transmission rate is hereafter referred to as "predetermined transmission rate priority". The predetermined transmission rate refers to a transmission rate determined for some purpose. As the predetermined transmission rate, there are, for example, the QoS-assured transmission rate and system-assured transmission rate. As the predetermined transmission rate, either the QoS-assured transmission rate or the system-assured transmission rate may be used. As the predetermined transmission rate, both the QoS-assured transmission rate and the system-assured transmission rate may also be used, or the sum or an average of the QoS-assured transmission rate and the system-assured transmission rate may also be used. The predetermined transmission rate priority is one of the individual priorities.

Figure 13B:
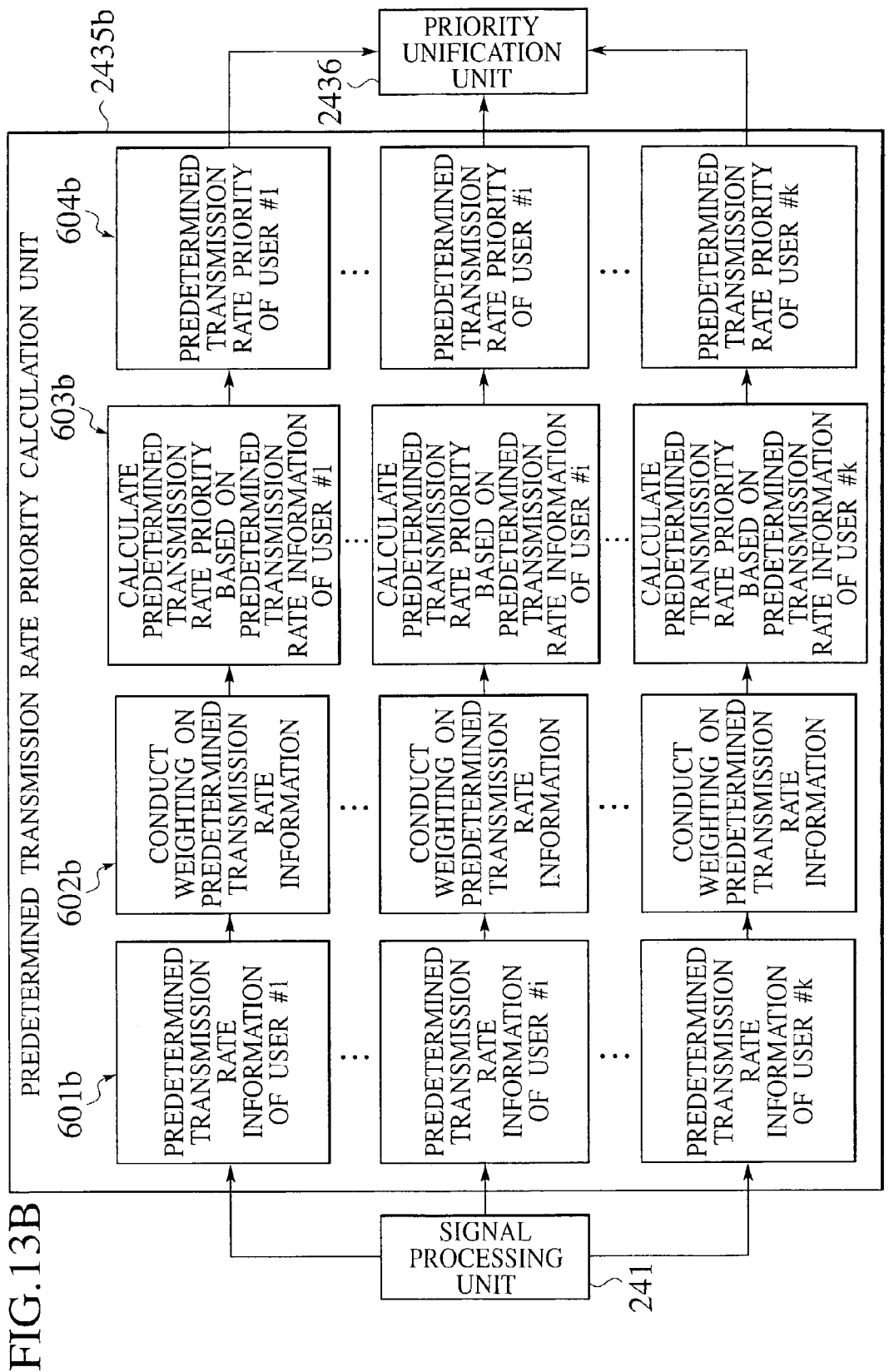

The predetermined transmission rate priority calculation unit 2435 may calculate the predetermined transmission rate priority by comparing predetermined transmission rates of packets transmitted to users, or may uniquely calculate the predetermined transmission rate priority for each of users based on the predetermined transmission rate of a packet to be transmitted to each user. FIG. 13A shows a predetermined transmission rate priority calculation unit 2435*a* in the case where the predetermined transmission rate priority is calculated by comparing predetermined transmission rates of packets to be transmitted to respective users. FIG. 13B shows a predetermined transmission rate priority calculation unit 2435*b* in the case where the predetermined transmission rate priority is calculated uniquely for each user based on the predetermined transmission rate of a packet to be transmitted to each user.

As shown in FIGS. 13A and 13B, each of the predetermined transmission rate priority calculation units 2435*a* and 2435*b* acquires predetermined transmission rate information concerning predetermined transmission rates of packets directed to the users #1 to #k of the mobile stations 3 (601*a*, 601*b*). In the case where the QoS-assured transmission rate is used as the predetermined transmission rate, both the QoS-assured transmission rate and the system-assured transmission rate are used as the predetermined transmission rate, or an average or the sum of the QoS-assured transmission rate and the system-assured transmission rate is used as the predetermined transmission rate, each of the predetermined transmission rate priority calculation units 2435*a* and 2435*b* acquires QoS information of a packet from the signal processing unit 241, and acquires information concerning the QoS-assured transmission rate. In the case where the system-assured transmission rate is used as the predetermined transmission rate, both the system-assured transmission rate and the QoS-assured transmission rate are used as the predetermined transmission rate, or an average or the sum of the system-assured transmission rate and the QoS-assured transmission rate is used as the predetermined transmission rate, each of the predetermined transmission rate priority calculation units 2435*a* and 2435*b* holds transmission destination user identification data and system-assured transmission rate the user is assured of, so as to be associated with each other. And each of the predetermined transmission rate priority calculation units 2435*a* and 2435*b* acquires the transmission destination user identification data from the signal processing unit 241, and acquires information concerning the system-assured transmission rate of the transmission destination user identification data.

If the QoS-assured transmission rate or the system-assured transmission rate is used as it is as the predetermined transmission rate, each of the predetermined transmission rate priority calculation units 2435*a* and 2435*b* uses the QoS-assured transmission rate or the system-assured transmission rate as it is. If the sum or average of the QoS-assured transmission rate and the system-assured transmission rate is used, then each of the predetermined transmission rate priority calculation units 2435*a* and 2435*b* obtains the sum or average of the QoS-assured transmission rate and the system-assured transmission rate by using the acquired QoS-assured transmission rate and system-assured transmission rate, and thus obtains the predetermined transmission rate information.

Each of the predetermined transmission rate priority calculation units 2435*a* and 2435*b* conducts weighting on acquired predetermined transmission rate information of the users #1 to #k (602*a*, 602*b*). Each of the predetermined transmission rate priority calculation units 2435*a* and 2435*b* conducts weighting on the predetermined transmission rate information. Each of the predetermined transmission rate priority calculation units 2435*a* and 2435*b* can set a weight according to the predetermined transmission rate. For example, each of the predetermined transmission rate priority calculation units 2435*a* and 2435*b* can set a weight so as to make the predetermined transmission rate information large and provide high priority for a user who is large in predetermined transmission rate.

As for the weighting, the predetermined transmission rate information may be made large by adding a weight having a positive value or multiplying a weight having a value greater than unity. On the contrary, the predetermined transmission rate information may be made small by adding a weight having a negative value or multiplying a weight having a value less than unity. Furthermore, in the case where a plurality of kinds of predetermined transmission rate information are used, each of the predetermined transmission rate priority calculation units 2435*a* and 2435*b* may provide respective kinds of QoS information with different weights. For example, each of the predetermined transmission rate priority calculation units 2435*a* and 2435*b* may conduct weighting by setting weights so as to make predetermined transmission rate information desired to be thought much of larger when calculating the priority. Each of the predetermined transmission rate priority calculation units 2435*a* and 2435*b* may not conduct weighting on the predetermined transmission rate information.

As shown in FIG. 13A, the predetermined transmission rate priority calculation unit 2435*a* then compares the predetermined transmission rate information of the users #1 to #k, and calculates predetermined transmission rate priorities of packets to be transmitted to the users #1 to #k (603*a*). For example, the predetermined transmission rate priority calculation unit 2435*a* provides users with order in order of decreasing predetermined transmission rate based on predetermined transmission rates of the users #1 to #k. And the predetermined transmission rate priority calculation unit 2435*a* calculates the predetermined transmission rate priorities of the users #1 to #k so as to make the predetermined transmission rate priority of a user early in order high and make the predetermined transmission rate priority of a user late in order low.

On the other hand, as shown in FIG. 13B, the predetermined transmission rate priority calculation unit 2435*b* uniquely calculates predetermined transmission rate priorities respectively of packets to be transmitted to the users #1 to #k based on the predetermined transmission rate information of the users #1 to #k (603*b*). For example, the predetermined transmission rate priority calculation unit 2435*b* previously sets a plurality of numerical value ranges of the predetermined transmission rate and predetermined transmission rate priorities in the case where the predetermined transmission rate is in the ranges. And the predetermined transmission rate priority calculation unit 2435*b* judges in which numerical value range the predetermined transmission rate of each of the users #1 to #k exists, and calculates a value set as predetermined transmission rate priority in the case where the predetermined transmission rate is in that numerical value range, as the predetermined transmission rate priority of the user.

For example, if the predetermined transmission rate of the user #i is in the numerical value range between a predetermined transmission rate (n) and a predetermined transmission rate (n+1) (where n is a natural number, and it represents an order of a numerical value that defines a numerical value range). In other words, if the relation predetermined transmission rate (n)≦predetermined transmission rate of user #i<predetermined transmission rate (n+1) is satisfied, then a value D previously set as predetermined transmission rate priority for the case where the predetermined transmission rate is in that numerical value range is selected as predetermined transmission rate priority. In this case, the predetermined transmission rate priority is set equal to D irrespective of predetermined transmission rates of other users.

Finally, each of the predetermined transmission rate priority calculation units 2435a and 2435b provides the priority unification unit 2436 with the calculated predetermined transmission rate priorities respectively of the users #1 to #k (604a, 604b). In the case where channel assignment is conducted by using only the predetermined transmission rate priority as the priority, each of the predetermined transmission rate priority calculation units 2435a and 2435b provides directly the weight processing unit 244 with the calculated transmission rate priorities of the users #1 to #k.

According to the predetermined transmission rate priority calculation units 2435a and 2435b, the control device 4 can conduct channel assignment based on the priority calculated considering the predetermined transmission rates. If the QoS-assured transmission rate or the system-assured transmission rate, both the QoS-assured transmission rate and the system-assured transmission rate, or the sum or average of the QoS-assured transmission rate and the system-assured transmission rate is used as the predetermined transmission rate, therefore, the base station 202 can-maintain the QoS-assured transmission rate and the system-assured transmission rate, cope with a request of QoS, and assures the user of the system-assured transmission rate.

The priority unification unit 2436 uses the retransmission packet priority, the transmission path situation priority, the QoS priority, the transmission waiting time priority, and the predetermined transmission rate priority as individual priorities, and determines the synthetic priority by unifying the priorities. The priority unification unit 2436 acquires the predetermined transmission rate priority as an individual priority from the predetermined transmission rate priority calculation unit 2435 as well, and calculates the synthetic priority according to the following equation (3). Except this, the priority unification unit 2436 is substantially the same as the priority unification unit 435 in the first embodiment. Therefore, the description will be omitted. In the equation (3), "u" represents the predetermined transmission rate priority, and "e" represents a coefficient for the predetermined transmission rate priority (where "e" is a positive real number)

$$av+bx+cy+dz+eu \tag{3}$$

If the priority unification unit 2436, for example, sets the coefficient "e" for the predetermined transmission rate priority as a fixed value greater than other coefficients "a" to "d", or make the coefficient "e" change so as to become greater than other coefficients "a" to "d", then the control device 204 can conduct channel assignment while thinking much of the predetermined transmission rate and giving priority to the predetermined transmission rate.

The weight processing unit 244 conducts weighting on the priority based on the reception state of the mobile station 3. The weight processing unit 244 judges the reception state of the mobile station 3 based on the situation of the transmission path formed between the mobile station 3 and the base station 202. For example, the weight processing unit 244 obtains an estimate value of success probability, which indicates the possibility that the transmission of the packet will succeed in the transmission path situation, as the reception state of the mobile station 3 based on the transmission path situation. And the weight processing unit 244 can calculate a weight based on the estimate value of success probability and conduct weighting processing.

Figure 14A:
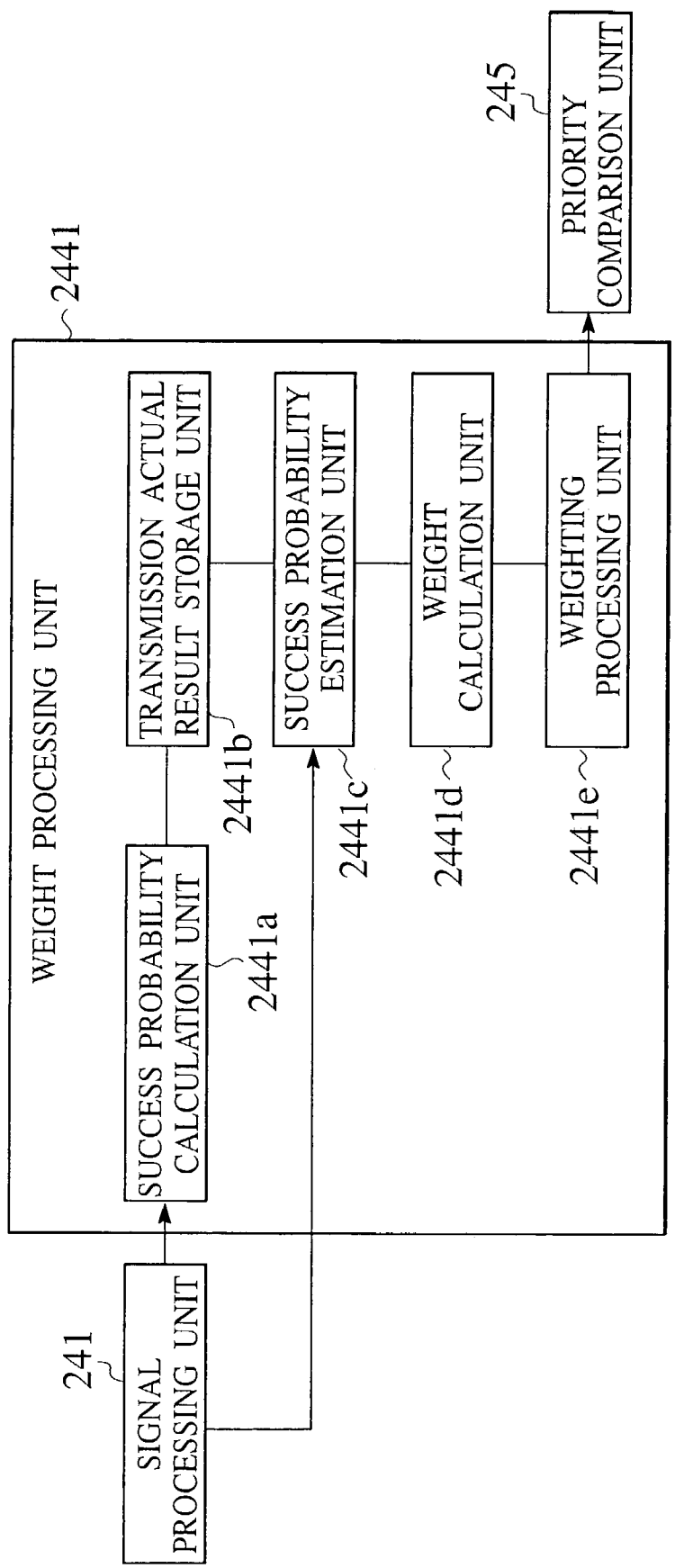

FIG. 14A shows a configuration of a weight processing unit 2441 for conducting weighting on the priority based on the reception state of the mobile station 3. The weight processing unit 2441 includes a success probability calculation unit 2441a, a transmission actual result storage unit 2441b, a success probability estimation unit 2441c, a weight calculation unit 2441d, and a weighting processing unit 2441e. The success probability calculation unit 2441a, the transmission actual result storage unit 2441b, and the success probability estimation unit 2441c are substantially the same as the success probability calculation unit 46a, the transmission actual result storage unit 46b, and the success probability estimation unit 46c shown in FIG. 10, respectively. However, the success probability estimation unit 2441c acquires the actual result value of success probability from the transmission actual result storage unit 2441b, and obtains the estimate value of success probability. The success probability estimation unit 2441c provides the weight calculation unit 2441d with the estimate value of success probability.

The weight calculation unit 2441d calculates a weight based on the reception rate of the mobile station 3 (hereafter referred to as "reception state weight"). The weight calculation unit 2441d provides the weighting processing unit 2441e with the calculated reception state weight. The weight calculation unit 2441d calculates the reception state weight based on the estimate value of success probability acquire from the success probability estimation unit 2441c.

For example, the weight calculation unit 2441d compares reception states of the mobile stations 3 of a plurality of users with each other, and calculates reception state weights for weighting the priorities of packets to be transmitted to the users. In this case, the weight calculation unit 2441d provides the users with order in order of decreasing estimate value of success probability as the reception states of the mobile stations of users. And the weight calculation unit 2441d calculates the reception state weights so as to make a reception state weight for the priority of a packet directed to a user early in order high and make a reception state weight for the priority of a packet directed to a user late in order low.

The weight calculation unit 2441d may uniquely calculate reception state weights to be used for weighting the priorities of packets to be transmitted to users, based on the reception states of the mobile stations 3 of the users. In this case, the weight calculation unit 2441d previously sets a plurality of numerical value ranges of success probability and reception state weights in the case where the estimate value of success probability is in the ranges. It is preferable that the weight calculation unit 2441d sets weights so that a reception state weight will heighten the priority as the estimate value of success probability corresponds to a range of greater numerical values. It is preferable that the weight calculation unit 2441d sets weights so that a reception state weight will lower the priority as the estimate value of success probability corresponds to a range of smaller numerical values.

For example, in the case where the reception state weight is added to the priority, it is preferable that a reception state weight corresponding to a numerical value range in which the estimate value of success probability is small is set equal to a negative value. In the case where priority is multiplied by the reception state weight, it is preferable that a reception state weight corresponding to a numerical value range in which the estimate value of success probability is small is set equal to a value less than unity. As a result, it is possible to lower the priority of a packet directed to a mobile station 3 that is extremely small in estimate value of success probability and poor in reception state, and prevent the packet from being transmitted. And the weight calculation unit 2441d determines in which numerical range the estimate value of success probability for the mobile station 3 of each user exists, and calculates a value preset as a reception state weight for the case where the estimate value of success probability exists in that numerical value range, as the reception state weight for the priority of the packet to be transmitted to the mobile station 3.

The weighting processing unit 2441e conducts weighting processing by performing addition or multiplication between the reception state weight provided from the weight calculation unit 2441d and the priority. In the case where it is desired to make priority of a packet directed to a certain user higher than priorities of packets directed to other users, the weighting processing unit 2441e can conduct weighting processing by adding a reception state weight having a positive value to the priority of the packet directed to the user desired to be made higher in priority, multiplying the priority of the packet directed to the user desired to be made higher in priority by a reception state weight having a value greater than unity, adding a reception state weight having a negative value to the priorities of packets of other users, or multiplying the priorities of packets of other users by a reception state weight having a value less than unity. The weighting processing unit 2441e provides the priority comparison unit 245 with the weighted priorities.

According to the weight processing unit 2441, it is possible to conduct weighting on the priority according to the actual reception state of the mobile station 3 and change the priority, and the control device 204 can conduct channel assignment with due regard to the actual reception state of the mobile station 3. Especially, in the case where the actual reception state of a certain mobile station 3 is poor, the weight processing unit 2441 can conduct weighting so as to make the priority of a packet to be transmitted to that mobile station 3 lower than priorities of other packets, and thus make the priority of the packet low. In the case where the actual reception state of a certain mobile station 3 is good, the weight processing unit 2441 can conduct weighting so as to make the priority of a packet to be transmitted to that mobile station 3 higher than priorities of other packets, and thus heighten the priority of the packet.

As a result, the control device 204 can assign a channel to a packet to be transmitted to a mobile station that is good in reception state. When the reception state of the mobile station 3 of the transmission destination is good, therefore, the base station 2 can assign a channel to a packet directed to that mobile station 3 and give an opportunity of transmission of the packet to the radio station 208. Therefore, the base station 2 can prevent from assigning a channel uselessly to a packet for the reason that priority of the packet once obtained is high and wasting radio resources. In other words, when the possibility that the transmission of a packet will fail is high even if the priority of the packet obtained once by the priority calculation unit 243 is high, the base station 2 lowers the priority of the packet by weighting the priority of the packet with the reception state weight or heighten priorities of other packets by weighting priorities of packets directed to other mobile stations 3 that are good in reception state with reception state weights. Thus the base station 2 can prevent from assigning an opportunity of transmission of a packet to a mobile station that is not good in reception state, to the radio unit 8, and from wasting the radio resources.

And the base station 202 assigns a channel to a packet directed to a mobile station 3 that is good in reception state and high in probability of success of transmission even though the priority obtained once by the priority calculation unit 243 is somewhat low, instead of the packet directed to the mobile station 3 that is not good in reception state. Thus it is possible to prevent resources from being wasted.

FIG. 14B shows a weight processing unit 2442 for conducting weighting on priority by synthetically considering the reception state, the transmission rate, the transmission waiting time, and the delay time. The weight processing unit 2442 calculates a synthetic weight by using, in addition to the reception state of the mobile station 3, a plurality of other kinds of information, and conducts weighting. The weight processing unit 2442 includes a success probability calculation unit 2442a, a transmission actual result storage unit 2442b, a success probability estimation unit 2442c, a transmission rate comparison unit 2442d, a transmission waiting time comparison unit 2442f, a delay time comparison unit 2442h, timers 2442e, 2442g and 2442i, a weight calculation unit 2442j, and a weighting processing unit 2442p. The weight calculation unit 2442j includes a reception state weight calculation unit 2442k, a transmission rate weight calculation unit 2442l, a transmission waiting time weight calculation unit 2442m, a delay time weight calculation unit 2442n, and a weight unification unit 2442o.

The success probability calculation unit 2442a, the transmission actual result storage unit 2442b, the success probability estimation unit 2442c, the transmission rate comparison unit 2442d, the transmission waiting time comparison unit 2442f, the delay time comparison unit 2442h, the timers 2442e, 2442g and 2442i, the weighting processing unit 2442p, the reception state weight calculation unit 2442k, the transmission rate weight calculation unit 2442l, the transmission waiting time weight calculation unit 2442m, the delay time weight calculation unit 2442n, and the weight unification unit 2442o are substantially the same as the success probability calculation unit 2441a, the transmission actual result storage unit 2441b, and the success probability estimation unit 2441c shown in FIG. 14A, and the transmission rate comparison unit 444a, the transmission waiting time comparison unit 444c, the delay time comparison unit 444e, the timers 444b, 444d and 444f, the weighting processing unit 444l, the weight calculation unit 2441d, the transmission rate weight calculation unit 444h, the transmission waiting time weight calculation unit 444i, the delay time weight calculation unit 444j, and the weight unification unit 444k shown in FIG. 7D, respectively.

The reception state weight calculation unit 2442k provides the weight unification unit 2442o with the calculated reception state weight. In the weight calculation unit 2442j, the reception state weight calculation unit 2442k is an individual weight calculation unit. In the present embodiment, the weight unification unit 2442o unifies the reception state weight, the transmission rate weight, the transmission waiting time weight, and the delay time weight, and determines the synthetic weight.

According to the weight calculation unit 2442j, the weight processing unit 2442 can calculate a weight with due regard to a plurality of kinds of information, and change the priority while considering the plurality of kinds of information. As a result, the base station 202 can implement simultaneously prevention of radio resource waste, maintenance of the assured transmission rate, maintenance of the assured transmission waiting time, and response to a request of the permissible delay time. Especially, while maintaining the assured transmission rate, the assured transmission waiting time, and the permissible delay time, the base station 202 can assign a channel to a packet directed to a mobile station 3 and give an opportunity of transmission of the packet to the mobile station 3, to the radio station 8 when the reception state of the mobile station 3 is comparatively good. Waste of radio resources can thus be prevented.

The priority comparison unit 245 compares priorities of packets weighted by the weight processing unit 244 with each other, and judges a packet to be transmitted. The priority comparison unit 245 fixes upon a weighted packet having high priority as the packet to be transmitted. On the other hand, the priority comparison unit 245 fixes upon weighted packets having low priority as the packets to be untransmitted this time, and determines to leave over the transmission of the packets.

The priority comparison unit 245 assigns a channel for transmitting a packet to the packet determined to be transmitted. The priority comparison unit 245 notifies the radio unit 208 of a result of the channel assignment. The radio unit 208 transmits the packet to the mobile station 3 according to the channel assignment notified of by the priority comparison unit 245. The priority comparison unit 245 compares priorities every packet, and conducts channel assignment every packet. It is preferable that immediately before actually transmitting a packet to the mobile station 3 the priority comparison unit 245 conducts fast comparison on the priority of the packet, determines a packet to be transmitted, and conducts channel assignment from instant to instant.

On the other hand, the priority comparison unit 245 provides the signal processing unit 241 with packet identification data of a packet determined to be left over in transmission, conducts priority calculation and weighting again, and notifies the signal processing unit 241 of a packet to be assigned a channel. Furthermore, the priority comparison unit 245 notifies the time control unit 242 of the result of priority comparison. The priority comparison unit 245 notifies the time control unit 242 of a decision result as to whether transmission should be executed or left over, in association with packet identification data of the packet. The packet determined to be left over in transmission enters a queue. Therefore, the time control unit 242 continues the measurement of the transmission waiting time on the packet a notice of leaving over transmission of which has been given to the time control unit 242 by the priority comparison unit 245. As a result, the transmission waiting time of the packet is gradually updated. On the other hand, as for the packet judged to be transmitted, it is not necessary to update the transmission waiting time, and consequently the time control unit 242 finishes the measurement of the transmission waiting time.

In this way, the priority comparison unit 245 implements a channel control unit that assigns a channel for transmission to the mobile station 3, to a packet, based on priority of the packet weighted by the weight processing unit 244. In the control device 204, the reception state of the mobile station 3 is considered by the weight processing unit 244. The priority comparison unit 245 can conduct channel assignment by comparing priorities weighted considering the reception state. In the control device 204, therefore, processing of channel assignment can be simplified as compared with the control device shown in FIG. 2.

(Communication Method)

A communication method executed by using the communication system including the base station 202 will now be described. As shown in FIG. 15, first, a packet from a terminal device arrives at the base station 202 via the network 10, and the network interface unit 205 acquires the packet (S201). The network interface unit 205 temporarily stores the acquired packet in the transmission buffer 206. The baseband processing unit 207 takes out the packet from the transmission buffer 206, and provides the signal processing unit 241 with the control information part of the packet.

The signal processing unit 241 acquires QoS information and transmission destination user identification data from the control information part of the packet. The predetermined transmission rate priority calculation unit 2435 holds the transmission destination user identification data and the system-assured transmission rate so as to associate them with each other, and acquires the system-assured transmission rate of a user of a mobile station 3 that is transmission destination based on the transmission destination user identification data. Furthermore, the predetermined transmission rate priority calculation unit 2435 acquires QoS-assured transmission rate from the QoS information. In this way, the predetermined transmission rate priority calculation unit 2435 acquires predetermined transmission rate information (S202).

A mobile station 3 conducts detection to determine whether there is an error in the received packet (S203). The mobile station 3 transmits a result of the detection to the base station 202 on an up control channel as a control signal containing ACK/NACK information to effect feedback (S204). The radio unit 208 receives the control signal from the mobile station 3, and the signal processing unit 241 acquires the control signal from the baseband processing unit 207, and acquires the ACK/NACK information (S205). The retransmission packet priority calculation unit 2431 determines whether the packet, QoS information of which has been acquired by the signal processing unit 241 at the step S202, is a retransmission packet or a new packet, based on the packet identification data and the ACK/NACK information (S206).

The mobile station 3 estimates the transmission path situation (S207). The mobile station 3 transmits the estimated transmission path situation to the base station 202 on an up control channel as a control signal containing transmission path information to effect feedback (S208). The radio unit 208 receives the control signal from the mobile station 3, and the signal processing unit 241 acquires the control signal from the baseband processing unit 207 and acquires the transmission path information (S209).

The priority calculation unit 243 calculates the synthetic priority of the packet based on the QoS information, the new/retransmission packet information, the transmission path information, and the predetermined transmission rate information (S210). The weight processing unit 244 conducts weighting on the synthetic priority calculated by the priority calculation unit 243 (S211). The priority comparison unit 245 compares weighted priority of a certain packet with weighted priorities of other packets, and determines whether the packet should be transmitted (S212). If the weighted priority of the packet is higher than priorities of other packets at the step (S212), then the priority comparison unit 245 judges that the packet should be transmitted. The priority comparison unit 245 assigns a channel to the packet, and the radio unit 208 transmits the packet to the mobile station 3 (S213).

On the other hand, if the weighted priority of the packet is lower than priorities of other packets at the step (S212), then the priority comparison unit 245 judges that the transmission of the packet should be left over. And the packet enters a queue. The priority comparison unit 245 notifies the time control unit 242 that the transmission of the packet is left over. And the time control unit 242 continues measurement of the transmission waiting time of the packet, and updates the transmission waiting time (S214). The priority comparison unit 245 notifies the signal processing unit 241 that the transmission of the packet is left over. The packet judged to be left over in transmission is subject to the priority calculation, priority weighting, and comparison of weighted priorities again. In the priority calculation and weighting, the transmission waiting time is also considered.

According to the communication system, the base station 202, the control device 204 and the communication method, the weight processing unit 244 conducts weighting on the priority calculated once by the priority calculation unit 243 based on the reception state of the mobile station 3. The priority comparison unit 245 can determine a packet to be transmitted based on the weighted priority, and conduct channel assignment. Without being necessarily restricted by priority calculated once, therefore, the base station 202 and the control device 204 can assign a channel as occasion may demand according to the reception state of the mobile station 3 at the time when the packet is transmitted.

What is claimed is:

1. A base station, comprising:
   an acquisition unit configured to acquire from a terminal device a plurality of packets to be transmitted to a mobile station;
   a priority calculation unit configured to calculate a priority of transmission of one packet of said plurality of packets relative to at least another packet of said plurality of packets;
   a weight processing unit configured to conduct weighting on the priority of the one packet calculated by the priority calculation unit to produce a weighted priority;
   a channel control unit configured to assign a channel for transmission to the one packet based on the weighted priority; and
   a transmission unit configured to transmit the one packet to the mobile station on the channel assigned by the channel control unit, wherein
   the weight processing unit conducts weighting on the priority based on a reception state of the mobile station, wherein the reception state is judged based on a status of a transmission path formed between the transmission unit and the mobile station, and the priority calculation unit calculates the priority based on whether the one packet is a retransmission packet transmitted to the mobile station again by the transmission unit, a status of a transmission path formed between the transmission unit and the mobile station, and quality of service of the one packet.

2. The base station according to claim 1, wherein the weight processing unit conducts weighting on the priority based on a predetermined transmission rate of the one packet.

3. The base station according to claim 1, wherein the weight processing unit conducts weighting on the priority based on a time during which the transmission unit does not transmit the one packet, since the acquisition unit has acquired the one packet.

4. The base station according to claim 1, wherein the priority calculation unit calculates the priority based on a time during which the transmission unit does not transmit the one packet, since the acquisition unit has acquired the one packet.

5. The base station according to claim 1, wherein the priority calculation unit calculates the priority based on a predetermined transmission rate of the one packet.

6. The base station according to claim 1, wherein the priority is calculated by using a plurality of kinds of information, and wherein the priority calculation unit comprises:
   a plurality of individual priority calculation units configured to calculate a plurality of individual priorities for said one packet based on the kinds of information; and
   a priority unification unit configured to unify the individual priorities calculated by the individual priority calculation units and to determine the priority.

7. The base station according to claim 6, wherein the priority unification unit determines the priority by multiplying the individual priorities respectively by coefficients and adding up the individual priorities respectively multiplied by the coefficients.

8. A control device, comprising:
   a priority calculation unit configured to calculate a priority of transmission of one packet of a plurality of packets relative to at least another packet of said plurality of packets;
   a weight processing unit configured to conduct weighting on the priority of the one packet calculated by the priority calculation unit to produce a weighted priority; and
   a channel control unit configured to assign a transmission channel to the one packet based on the weighted priority, wherein
   the weight processing unit conducts weighting on the priority based on a reception state of a mobile station, wherein the reception state is judged based on a status of a transmission path formed between a transmission unit and the mobile station, and the priority calculation unit calculates the priority based on whether the one packet is a retransmission packet transmitted to the mobile station again by the transmission unit, a status of a transmission path formed between the transmission unit and the mobile station, and quality of service of the one packet.

9. A communication system, comprising:
   a mobile station configured to conduct packet transmission and reception; and
   a base station, wherein the base station comprises:
      an acquisition unit configured to acquire from a terminal device a plurality of packets to be transmitted to a mobile station;
      a priority calculation unit configured to calculate a priority of transmission of one packet of said plurality of packets relative to at least another packet of said plurality of packets;
      a weight processing unit configured to conduct weighting on the priority of the one packet calculated by the priority calculation unit to produce a weighted priority;
      a channel control unit configured to assign a channel for transmission to the one packet based on the weighted priority; and
      a transmission unit configured to transmit the one packet to the mobile station on the channel assigned by the channel control unit, wherein
      the weight processing unit conducts weighting on the priority based on a reception state of the mobile station, wherein the reception state is judged based on a status of a transmission path formed between the transmission unit and the mobile station, and the priority calculation unit calculates the priority based on whether the one packet is a retransmission packet transmitted to the mobile station again by the transmission unit, a status of a transmission path formed between the transmission unit and the mobile station, and quality of service of the one packet.

10. A communication method using a base station, comprising:

acquiring from a terminal device a plurality of packets to be transmitted to a mobile station;

calculating a priority of transmission of one packet of said plurality of packets relative to at least another packet of said plurality of packets;

conducting weighting on the calculated priority of the one packet to produce a weighted priority;

assigning a channel for transmission to the packet based on the weighted priority of the one packet; and transmitting from a transmission unit the one packet to the mobile station on the assigned channel, wherein the conducting weighting on the priority is based on a reception state of the mobile station, wherein the reception state is judged based on a status of a transmission path formed between the transmission unit and the mobile station, and the calculating the priority of transmission is based on whether the one packet is a retransmission packet transmitted to the mobile station again by the transmission unit, a status of a transmission path formed between the transmission unit and the mobile station, and quality of service of the one packet.

11. The communication method according to claim 10, wherein the base station conducts weighting on the priority based on a predetermined transmission rate of the one packet.

12. The communication method according to claim 10, wherein the base station conducts weighting on the priority based on a time during which the base station does not transmit the one packet, since the base station has acquired the one packet.

13. The communication method according to claim 10, wherein the base station calculates the priority based on a predetermined quality of service of the one packet.

14. The communication method according to claim 10, wherein the priority is calculated by using a plurality of kinds of information, and wherein the base station calculates a plurality of individual priorities respectively based on the kinds of information used to calculate the priority, and the base station unifies the individual priorities and determines the priority.

15. The communication method according to claim 14, wherein the base station determines the priority by multiplying the individual priorities respectively by coefficients and adding up the individual priorities respectively multiplied by the coefficients.

* * * * *